(12) United States Patent
Nori et al.

(10) Patent No.: US 7,809,763 B2
(45) Date of Patent: Oct. 5, 2010

(54) METHOD(S) FOR UPDATING DATABASE OBJECT METADATA

(75) Inventors: Sarita Brahmandam Nori, Fremont, CA (US); Christine Pae, San Francisco, CA (US); Bhuvaneswari Thiagarajan, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 449 days.

(21) Appl. No.: 10/966,250

(22) Filed: Oct. 15, 2004

(65) Prior Publication Data

US 2006/0085465 A1    Apr. 20, 2006

(51) Int. Cl.
*G06F 7/00* (2006.01)
*G06F 9/44* (2006.01)

(52) U.S. Cl. ................... 707/802; 707/609; 717/120
(58) Field of Classification Search ............ 707/101, 707/609, 802, 803; 717/120
See application file for complete search history.

(56) References Cited

U.S. PATENT DOCUMENTS

| | | | | |
|---|---|---|---|---|
| 5,991,772 | A | | 11/1999 | Doherty et al. ............. 707/202 |
| 6,003,039 | A | * | 12/1999 | Barry et al. ............. 707/103 R |
| 6,112,207 | A | * | 8/2000 | Nori et al. .................. 707/101 |
| 6,112,210 | A | * | 8/2000 | Nori et al. ............... 707/103 R |
| 6,167,405 | A | * | 12/2000 | Rosensteel et al. .......... 707/102 |
| 6,397,125 | B1 | * | 5/2002 | Goldring et al. ............ 700/200 |
| 6,418,451 | B1 | * | 7/2002 | Maimone .................... 707/200 |
| 6,480,847 | B1 | * | 11/2002 | Linenbach et al. ............. 707/8 |
| 6,505,228 | B1 | * | 1/2003 | Schoening et al. .......... 718/106 |
| 6,535,868 | B1 | * | 3/2003 | Galeazzi et al. ................ 707/2 |
| 6,549,901 | B1 | * | 4/2003 | Loaiza et al. .................. 707/7 |
| 6,618,822 | B1 | | 9/2003 | Loaiza et al. ................. 714/20 |
| 6,708,186 | B1 | | 3/2004 | Claborn et al. ............. 707/107 |
| 6,732,095 | B1 | | 5/2004 | Warshavsky et al. .......... 707/5 |
| 6,785,673 | B1 | | 8/2004 | Fernandez et al. ............ 707/3 |
| 6,804,671 | B1 | * | 10/2004 | Loaiza et al. .................. 707/7 |
| 6,839,724 | B2 | * | 1/2005 | Manchanda et al. ......... 707/203 |
| 6,901,346 | B2 | * | 5/2005 | Tracy et al. ................. 702/181 |
| 6,912,591 | B2 | * | 6/2005 | Lash ......................... 709/246 |
| 6,934,727 | B2 | * | 8/2005 | Berkowitz et al. ........ 715/500.1 |
| 6,976,039 | B2 | * | 12/2005 | Chefalas et al. ............. 707/204 |
| 6,985,912 | B2 | * | 1/2006 | Mullins et al. .......... 707/103 R |
| 6,993,448 | B2 | * | 1/2006 | Tracy et al. ................. 702/119 |
| 6,999,956 | B2 | * | 2/2006 | Mullins ......................... 707/2 |
| 7,016,920 | B2 | * | 3/2006 | Mastrianni et al. .......... 707/200 |
| 7,054,877 | B2 | * | 5/2006 | Dettinger et al. ............ 707/101 |

(Continued)

OTHER PUBLICATIONS

"Oracle Application Developer's Guide—XML 10g (9.04) Part No. B12099-01", Sep. 2003; p. 13-2, 13-3, 13-8, 13-9,13-1013-14, 13-15.*

(Continued)

*Primary Examiner*—Robert Stevens
(74) *Attorney, Agent, or Firm*—Silicon Valley Patent Group LLP; Omkar Suryadevara

(57) ABSTRACT

Two computers are respectively programmed to generate descriptions of database objects (such as tables) in a first database, and compare the generated descriptions to corresponding schema objects in a second database. Objects in the second database are changed to conform to the first database if differences are found during comparison. The just-described differences in objects may arise due to changes being made to a software program that uses data contained in the objects.

21 Claims, 13 Drawing Sheets

U.S. PATENT DOCUMENTS

| | | | |
|---|---|---|---|
| 7,100,195 B1* | 8/2006 | Underwood | 726/2 |
| 7,191,436 B1* | 3/2007 | Durr et al. | 717/170 |
| 7,266,595 B1* | 9/2007 | Black et al. | 709/223 |
| 7,380,270 B2* | 5/2008 | Tracy et al. | 726/3 |
| 7,398,263 B2* | 7/2008 | Dettinger et al. | 707/1 |
| 7,693,976 B2* | 4/2010 | Perry et al. | 709/223 |
| 2002/0042687 A1* | 4/2002 | Tracy et al. | 702/119 |
| 2002/0069035 A1* | 6/2002 | Tracy et al. | 702/181 |
| 2002/0083183 A1* | 6/2002 | Pujare et al. | 709/231 |
| 2002/0091702 A1* | 7/2002 | Mullins | 707/100 |
| 2002/0129352 A1* | 9/2002 | Brodersen et al. | 717/174 |
| 2002/0178173 A1* | 11/2002 | Chefalas et al. | 707/200 |
| 2002/0178436 A1* | 11/2002 | Mastrianni et al. | 717/110 |
| 2003/0050718 A1* | 3/2003 | Tracy et al. | 700/91 |
| 2003/0074367 A1* | 4/2003 | Kaler et al. | 707/102 |
| 2004/0034849 A1* | 2/2004 | Cohen et al. | 717/120 |
| 2004/0162885 A1* | 8/2004 | Garg et al. | 709/213 |
| 2004/0193579 A1* | 9/2004 | Dettinger et al. | 707/3 |
| 2004/0210607 A1* | 10/2004 | Manchanda et al. | 707/203 |
| 2004/0260658 A1* | 12/2004 | Dettinger et al. | 705/400 |
| 2005/0021536 A1* | 1/2005 | Fiedler et al. | 707/100 |
| 2005/0027674 A1* | 2/2005 | Potter et al. | 707/1 |
| 2005/0075996 A1* | 4/2005 | Dettinger et al. | 707/1 |
| 2005/0171961 A1* | 8/2005 | Culbreth et al. | 707/100 |
| 2005/0198247 A1* | 9/2005 | Perry et al. | 709/223 |
| 2005/0228798 A1* | 10/2005 | Shepard et al. | 707/100 |
| 2005/0234984 A1* | 10/2005 | Rogerson et al. | 707/104.1 |
| 2006/0150182 A1* | 7/2006 | Hughes et al. | 717/174 |
| 2006/0230063 A1* | 10/2006 | Pollinger | 707/103 Y |
| 2007/0055647 A1* | 3/2007 | Mullins et al. | 707/2 |

OTHER PUBLICATIONS

"Oracle9i OLAP Services, Concepts and Administration Guide, Release 1 (9.0.1); A88755-01"; Jun. 1, 2001; p. 4-24.*

Petrov, Ilia, et al., "iRM: An OMG MOF Based Repository System with Querying Capabilities", ER 2004, LNCS 3288, Springer-Verlag, Berlin, Germany, © 2004, pp. 850-851.*

Bhattacharya, Suparna, et al., "Coordinating Backup/Recovery and Data Consistency Between Database and File Systems", ACM SIGMOD 2002, Madison, WI, Jun. 4-6, 2002, pp. 500-511.*

Bernstein, Philip A., et al., "An Overview of Repository Technology", Proc. of the 20th VLDB Conference, Santiago, Chile, © 1994, pp. 705-713.*

Quix, Christoph, "Repository Support for Data Warehouse Evolution", DMDW '99, Heidelberg, Germany, Jun. 14-15, 1999, pp. 4-1 to 4-9.*

Dunagan, John, et al., "Towards a Self-Managing Software Patching Process Using Black-Box Persistent-State Manifests", ICAC '04, May 2004, pp. 106-113.*

Claypool, Kajal T., et al., "OQL_SERF: An ODMG Implementation of the Template-Based Schema Evolution Framework", Proc. of the 1998 Conf. of the Centre for Advanced Studies on Collaborative Research, Toronto, Ontario, Canada, © 1998, pp. 1-9.*

Tsou, Ming-Hsiang, et al., "Client-Server Components and Metadata Objects for Distributed Geographic Information Services", GIS/LIS '98, Ft. Worth, TX, Nov. 1998, pp. 590-599.*

Rundensteiner, E. A., et al., "SERF: ODMG-Based Generic Restructuring Facility", SIGMOD '99, Philadelphia, PA, © 1999, pp. 568-570.*

Sen, Arun, "Metadata Management: Past, Present and Future", Decision Support Systems, vol. 37, Issue 1, Apr. 2004, pp. 151-173.*

Eve Anderson, "Reverse Engineering A Data Model" Using the Oracle Dictionary, (believed to be prior to Sep. 21, 2004), pp. 9.

"Using Metadata API", Oracle® Application Developer's Guide—XML, 10g Release 1 (9.0.4) Part No. B12099-01, (believed to be prior to Sep. 22, 2004), pp. 13.

"Using the Metadata API", Oracle® Database Utilities, 10g Release 1 (10.1) Part No. B10825-01, (believed to be prior to Sep. 22, 2004), pp. 16.

"DDL Generation—Oracle's Answer to Save You Time and Money", Database Journal: Oracle Database Administration News, Articles, May 1, 2003, pp. 5.

* cited by examiner

```
<?xml version="1.0" ?>
- <!-- $Header: FndXdfGen.java 115.32 2004/09/24 17:05:28 bhthiaga noship $ -->
- <!-- The following dbdrv hint(s) are auto-generated by the FndXdfGen utility.
If you need additional dbdrv hints or wish to modify the existing hints
(eg. make changes in regard to phase/sub-phase), you will need to do so manually.
-->
- <!-- dbdrv: exec java oracle/apps/fnd/odf2 FndXdfCmp.class java &phase=tab \ -->
- <!-- dbdrv: checkfile:~PROD:~PATH:~FILE:tab_table &un_apps &pw_apps &un_apps \ -->
- <!-- dbdrv: &pw_apps &jdbc_protocol &jdbc_db_addr table \ -->
- <!-- dbdrv: &fullpath_~PROD_~PATH_~FILE &fullpath_fnd_patch/115/xdf_xsl -->
- <!--
```

Primary Object's Application Short Name :
   FND
If this application short name is incorrect please regenerate
the xdf file by providing the parameter owner_app_shortname
with the correct value.
Primary Object Schema Name :
   APPS
Primary Object Name :
   TEST_TABLE
Primary Object Type :
   TABLE
Dependent Object Information :
Indexes on TEST_TABLE :
   TEST_TABLE_I1

Sequence(s) on TEST_TABLE :
   None
Policy(ies) on TEST_TABLE :
   None
-->
- <!-- Version : 115.10.5    -->

```
<ROWSET>
 <APPL_SHORT_NAME>FND</APPL_SHORT_NAME>
 <APPS_OBSOLETE_OBJ>NONE</APPS_OBSOLETE_OBJ>
 <TYPE_APPL_SHORT_NAME>0</TYPE_APPL_SHORT_NAME>
 <APPS_APPLY_VERSION>0</APPS_APPLY_VERSION>
 <APPS_XDF_VERSION_NUM>115.10.5</APPS_XDF_VERSION_NUM>
- <APPS_AOL_METADATA>
± <APPS_FND_TABLES>
 <APPS_TABLE_TYPE>T</APPS_TABLE_TYPE>
 <APPS_DESCRIPTION />
 <APPS_OWNER>SEED</APPS_OWNER>
 <APPS_LAST_UPDATE_DATE>2004/09/30</APPS_LAST_UPDATE_DATE>
 </APPS_FND_TABLES>
± <APPS_FND_COLUMNS>
- <APPS_FND_COLUMN_ITEM>
 <APPS_COLUMN_NAME>COL1</APPS_COLUMN_NAME>
 <APPS_DESCRIPTION />
 <APPS_TRANSLATE_FLAG>N</APPS_TRANSLATE_FLAG>
 <APPS_FLEXFIELD_USAGE_CODE>N</APPS_FLEXFIELD_USAGE_CODE>
 <APPS_FLEXFIELD_APP_ID />
 <APPS_FLEXFIELD_NAME />
 <APPS_OWNER>SEED</APPS_OWNER>
 <APPS_LAST_UPDATE_DATE>2004/09/30</APPS_LAST_UPDATE_DATE>
 </APPS_FND_COLUMN_ITEM>
- <APPS_FND_COLUMN_ITEM>
 <APPS_COLUMN_NAME>COL2</APPS_COLUMN_NAME>
 <APPS_DESCRIPTION />
 <APPS_TRANSLATE_FLAG>N</APPS_TRANSLATE_FLAG>
 <APPS_FLEXFIELD_USAGE_CODE>N</APPS_FLEXFIELD_USAGE_CODE>
 <APPS_FLEXFIELD_APP_ID />
 <APPS_FLEXFIELD_NAME />
 <APPS_OWNER>SEED</APPS_OWNER>
 <APPS_LAST_UPDATE_DATE>2004/09/30</APPS_LAST_UPDATE_DATE>
 </APPS_FND_COLUMN_ITEM>
 </APPS_FND_COLUMNS>
```

411

```xml
<APPS_FND_PRIMARY_KEYS>
-<APPS_FND_PRIMARY_KEY_ITEMS>
 <APPS_PRIMARY_KEY_NAME />
 <APPS_DESCRIPTION />
 <APPS_AUDIT_KEY_FLAG>N</APPS_AUDIT_KEY_FLAG>
 <APPS_PRIMARY_KEY_TYPE>D</APPS_PRIMARY_KEY_TYPE>
 <APPS_OWNER>SEED</APPS_OWNER>
 <APPS_LAST_UPDATE_DATE>2004/09/30</APPS_LAST_UPDATE_DATE>
 </APPS_FND_PRIMARY_KEY_ITEMS>
 </APPS_FND_PRIMARY_KEYS>
±<APPS_FND_PK_COLUMNS>
-<APPS_FND_PK_COLUMN_ITEMS>
 <APPS_PRIMARY_KEY_NAME />
 <APPS_PK_COLUMN_NAME />
 <APPS_PK_COLUMN_SEQUENCE />
 <APPS_OWNER>SEED</APPS_OWNER>
 <APPS_LAST_UPDATE_DATE>2004/09/30</APPS_LAST_UPDATE_DATE>
 </APPS_FND_PK_COLUMN_ITEMS>
 </APPS_FND_PK_COLUMNS>
±<APPS_FND_FOREIGN_KEYS>
-<APPS_FND_FOREIGN_KEY_ITEMS>
 <APPS_FOREIGN_KEY_NAME />
 <APPS_PK_APP_SHORT_NAME />
 <APPS_PK_TABLE_NAME />
 <APPS_PK_NAME />
 <APPS_DESCRIPTION />
 <APPS_CASCADE_BEHAVIOR />
 <APPS_FK_RELATION />
 <APPS_CONDITION />
 <APPS_OWNER>SEED</APPS_OWNER>
 <APPS_LAST_UPDATE_DATE>2004/09/30</APPS_LAST_UPDATE_DATE>
 </APPS_FND_FOREIGN_KEY_ITEMS>
 </APPS_FND_FOREIGN_KEYS>
±<APPS_FND_FK_COLUMNS>
-<APPS_FND_FK_COLUMN_ITEMS>
 <APPS_FK_NAME />
 <APPS_FK_SEQUENCE />
 <APPS_CASCADE_VALUE />
 <APPS_OWNER>SEED</APPS_OWNER>
 <APPS_LAST_UPDATE_DATE>2004/09/30</APPS_LAST_UPDATE_DATE>
 </APPS_FND_FK_COLUMN_ITEMS>
 </APPS_FND_FK_COLUMNS>
±<APPS_FND_HISTOGRAM>
-<APPS_FND_HISTOGRAM_ITEMS>
 <APPS_COLUMN_NAME />
 <APPS_PARTITION />
 <APPS_HSIZE />
 <APPS_OWNER>SEED</APPS_OWNER>
 <APPS_LAST_UPDATE_DATE>2004/09/30</APPS_LAST_UPDATE_DATE>
 </APPS_FND_HISTOGRAM_ITEMS>
 </APPS_FND_HISTOGRAM>
±<APPS_FND_OBJECT_TABLESPACE>
 <APPS_TABLESPACE_CLASSIFICATION>TRANSACTION_TABLES
 </APPS_TABLESPACE_CLASSIFICATION>
 </APPS_FND_OBJECT_TABLESPACE>
 </APPS_AOL_METADATA>
```

```
<STORAGE>
<FILE_NUM>289</FILE_NUM>
<BLOCK_NUM>20284</BLOCK_NUM>
<TYPE_NUM>5</TYPE_NUM>
<TS_NUM>15</TS_NUM>
<BLOCKS>5</BLOCKS>
<EXTENTS>1</EXTENTS>
<INIEXTS>5</INIEXTS>
<MINEXTS>1</MINEXTS>
<MAXEXTS>505</MAXEXTS>
<EXTSIZE>5</EXTSIZE>
<EXTPCT>50</EXTPCT>
<USER_NUM>173</USER_NUM>
<LISTS>1</LISTS>
<GROUPS>1</GROUPS>
<BITMAPRANGES>0</BITMAPRANGES>
<CACHEHINT>0</CACHEHINT>
<SCANHINT>0</SCANHINT>
<HWMINCR>268823</HWMINCR>
<FLAGS>1</FLAGS>
</STORAGE>
<TS_NAME>APPLSYSD</TS_NAME>
<BLOCKSIZE>8192</BLOCKSIZE>
<DATAOBJ_NUM>268823</DATAOBJ_NUM>
<COLS>2</COLS>
<PCT_FREE>10</PCT_FREE>
<PCT_USED>40</PCT_USED>
<INITRANS>1</INITRANS>
<MAXTRANS>255</MAXTRANS>
<FLAGS>1</FLAGS>
<AUDIT_VAL>--------------------------------</AUDIT_VAL>
<INTCOLS>2</INTCOLS>
<KERNELCOLS>2</KERNELCOLS>
<PROPERTY>536870912</PROPERTY>
<TRIGFLAG>0</TRIGFLAG>
<SPARE1>736</SPARE1>
<SPARE6>30-SEP-04</SPARE6>
```

FIG. 4E

```
<COL_LIST>
<COL_LIST_ITEM> <APPS_XDF_COL_HASHCODE>456465347
</APPS_XDF_COL_HASHCODE>
  <OBJ_NUM>268823</OBJ_NUM>
  <COL_NUM>1</COL_NUM>
  <INTCOL_NUM>1</INTCOL_NUM>
  <SEGCOL_NUM>1</SEGCOL_NUM>
  <PROPERTY>0</PROPERTY>
  <NAME>COL1</NAME>
  <TYPE_NUM>2</TYPE_NUM>
  <LENGTH>22</LENGTH>
  <PRECISION_NUM>15</PRECISION_NUM>
  <SCALE>0</SCALE>
  <NOT_NULL>0</NOT_NULL>
  <CHARSETID>0</CHARSETID>
  <CHARSETFORM>0</CHARSETFORM>
  <SPARE1>0</SPARE1>
  <SPARE2>0</SPARE2>
  <SPARE3>0</SPARE3>
</COL_LIST_ITEM>
<COL_LIST_ITEM>
  <APPS_XDF_COL_HASHCODE>435059273
  </APPS_XDF_COL_HASHCODE>
  <OBJ_NUM>268823</OBJ_NUM>
  <COL_NUM>2</COL_NUM>
  <INTCOL_NUM>2</INTCOL_NUM>
  <SEGCOL_NUM>2</SEGCOL_NUM>
  <PROPERTY>0</PROPERTY>
  <NAME>COL2</NAME>
  <TYPE_NUM>12</TYPE_NUM>
  <LENGTH>7</LENGTH>
  <NOT_NULL>0</NOT_NULL>
  <CHARSETID>0</CHARSETID>
  <CHARSETFORM>0</CHARSETFORM>
  <SPARE1>0</SPARE1>
  <SPARE2>0</SPARE2>
  <SPARE3>0</SPARE3>
</COL_LIST_ITEM>
</COL_LIST>
<CON0_LIST />
<CON1_LIST />
<CON2_LIST />
</TABLE_T>
</ROW>
```

FIG. 4F

```
<ROW>
<INDEX_T> <APPS_XDF_OBJ_HASHCODE>44435008
</APPS_XDF_OBJ_HASHCODE>
...
<SCHEMA_OBJ>
 <OBJ_NUM>268885</OBJ_NUM>
 <OWNER_NAME>APPS</OWNER_NAME>
 <NAME>TEST_TABLE_11</NAME>
 <NAMESPACE>4</NAMESPACE>
 <FLAGS>0</FLAGS>
 <SPARE1>6</SPARE1>
 <SPARE2>65535</SPARE2>
 </SCHEMA_OBJ>
<COL_LIST>
<COL_LIST_ITEM>
 <OBJ_NUM>268885</OBJ_NUM>
 <BO_NUM>268823</BO_NUM>
 <INTCOL_NUM>1</INTCOL_NUM>
<COL>
 <OBJ_NUM>268823</OBJ_NUM>
 <COL_NUM>1</COL_NUM>
 <INTCOL_NUM>1</INTCOL_NUM>
 <SEGCOL_NUM>1</SEGCOL_NUM>
 <PROPERTY>0</PROPERTY>
 <NAME>COL1</NAME>
 <TYPE_NUM>2</TYPE_NUM>
 </COL>
 <POS_NUM>1</POS_NUM>
 <SEGCOL_NUM>0</SEGCOL_NUM>
 <SEGCOLLEN>0</SEGCOLLEN>
 <OFFSET>0</OFFSET>
 <FLAGS>0</FLAGS>
 <SPARE2>0</SPARE2>
 </COL_LIST_ITEM>
 </COL_LIST>
 <TS_NAME>APPLSYSD</TS_NAME>
 <BLOCKSIZE>8192</BLOCKSIZE>
<STORAGE>
...
 </STORAGE>
 <DATAOBJ_NUM>268885</DATAOBJ_NUM>
...
 </INDEX_T>
 </ROW>
 </ROWSET>
```

```
START_OF_AD_ODF_FILE
# $Header: afmac.odf 115.1 2004/02/21 13:01:59 shvishwa noship $
# Created by ODF Generator from Oracle Username:
# WARNING: Do not edit this file!!!#
# dbdrv: exec ~PROD ~PATH ~FILE odf &phase=tab \
# dbdrv: checkfile:~PROD:~PATH:~FILE:tab_tables mode=tables
START_OF_BUILDING_BLOCK
# Application Id, Building Block Id
0 9365
# Building Block Name
MULTI-ORG
# Application Short Name
FND
# Product abbreviation
fnd
1%START_OF_MEMBER_TABLES
2%START_OF_TABLE
# Table Name
TEST_TABLE
# Application Id, Table Id
0 101109
# Table Sequence
10
# Initial Extent, Next Extent, Auto Size
4K 8K autosize
# Minimum Extents, Maximum Extents, Pct Increase
1 50 0
# Initial Transactions, Maximum Transactions, Pct Free, Pct Used
1 255 10 40
Column Name, Column Sequence, Null?, Column Type, Length, Precision, Scale,
#    Column_id, Translate?, FKColumn?
# Default Value
3%START_OF_COLUMNS
COL1               1 N   V 15 NULL NULL  NULL N N
END_OF_STRING
COL2               2 N   D 7 NULL NULL  NULL N N
END_OF_STRING
3%END_OF_COLUMNS
1%END_OF_MEMBER_TABLES
END_OF_BUILDING_BLOCK
END_OF_AD_ODF_FILE
```

601

**FIG. 6B
(prior art)**
```
SET VERIFY OFF
WHENEVER SQLERROR EXIT FAILURE ROLLBACK
WHENEVER OSERROR EXIT FAILURE ROLLBACK

DROP TABLE "TEST_TABLE"

CREATE TABLE "TEST_TABLE"
   (   "COL1" NUMBER(15,0),
       "COL2" DATE
   )
```

METHOD(S) FOR UPDATING DATABASE OBJECT METADATA

BACKGROUND

Distribution of software upgrades and source code changes has become a familiar routine that provides customers of a software product with increased features, bug fixes, new drivers and other updates to the software product (which may be, for example, application software such as "ORACLE FINANCIALS" that is commonly used by customers to implement finance-related functions in their computers). An object through which software upgrades are distributed is typically referred to as a software patch.

For application software used in large enterprises (such as a publicly-owned corporation), a database is a quintessential element that provides scalable, performance-oriented data storage. Patches for portions of application software that interface to the database may require corresponding modifications to the database itself. Specifically, changes may need to be made to one or more attributes of tables, indexes, or views, e.g. a new column for holding an employee's middle initial may need to be added to a table and/or an existing column (or combination of columns) may need to be indexed to support patches being made to application software.

Unlike code changes related to software written in high level languages (e.g. Java/C/C++), a change to a database needs to be handled carefully to not adversely impact or in any manner corrupt data that is already existing in the database at the time of the change. Enterprise Applications such as Oracle E-Business Suite Applications rarely enforce a rigid patch level (e.g. identified by a release number and/or a version number) for their customers. In other words, customers have the flexibility to adopt different patch levels for products used by them, as per their implementation and configuration. Such scenarios pose additional patching challenges for changes to database components.

Keeping in mind the criticality of preserving existing data, patching of a database currently requires extensive potential impact analysis, including consideration of database object revision history with a goal of correctly upgrading the customer's environment per their patch level. Database patch creation process that is traditionally performed involves human inefficiencies and redundancies, as several Release and Development personnel for different products that constitute the application (such as Oracle's E-Business Suite Applications) perform repetitive analysis. Additionally, in spite of laborious analysis, the results are error prone and are likely to cause failures during patching, on account of missing and/or overlooked object revisions, or failed handling of object dependencies. Yet another reason is a failure in the just-described analysis to anticipate different target database versions that customers may have implemented.

A prior art utility for patching databases, called "ODF", can be used by application development personnel to capture and propagate metadata definitions of four types of database objects—tables, indexes, sequences and views. A listing of the output generated by the ODF utility is shown in FIG. 6A as metadata 601 for an example of a simple database containing a single object of the type table, which is called "TEST_TABLE" and which has two columns. Note that the listing in FIGS. 6A and 6B is expressed in a non-standard syntax which is proprietary and requires a custom parser specific to the syntax.

Note that the ODF utility captures metadata 601 for only four types of objects identified in the previous paragraph, and for no other objects (e.g. triggers, constraints, queues and policies were not supported). Applicants note that the failure of ODF to support all types of database objects makes it an incomplete solution. Furthermore, the metadata 601 that is captured by ODF for even just these four types of objects is incomplete for another reason. Specifically, Applicants note that many important properties of these database objects (for e.g. Table properties like Partitioned/non-partitioned, Global temporary v/s Permanent, Index organized) were not supported.

Moreover, the above-described partial metadata 601 is extracted by ODF from a set of application-specific tables. Applicants note that the use of application-specific tables, results in at least two issues with ODF. First, the prior art ODF utility additionally requires a CASE (Computer-Aided Software Engineering) data-model repository (such as Oracle Designer) and also other snapshot utilities to propagate metadata definitions 601 from the CASE data-model repository to the database. Second, metadata 601 captured by ODF has the risk of being inaccurate, as it is not captured from the source of truth (system data dictionary) but instead from an intermediate repository.

Also, ODF captures metadata 601 (FIG. 6A) for only a list of those individual objects that are manually identified by a developer of an application for which a patch is being developed. Applicants note that requiring the developer to list all objects whose metadata is to be captured makes ODF prone to human error and results in one or more object definitions being missed. Furthermore, ODF captures the metadata of objects in a non-standard format shown in FIG. 6A. Applicants note that failure to use XML prevents easy data exchange and also does not allow any data transformation/manipulation. Moreover, ODF's stores the metadata for a huge number of mostly unrelated objects in a very large single file. Applicants have found that such bundling of unrelated objects into a single file has an adverse impact on performance because each and every object in the single file is compared to the target database during patching of the target database. Finally, ODF did not use any sophisticated approaches in comparing metadata 601 to the target database.

An alternative to ODF is to manually prepare SQL scripts. There is no concept of a metadata definition file in the context of SQL Scripts. Instead, the SQL scripts execute specific, hard-coded DDL (Data Definition Language) commands like DROP TABLE, CREATE TABLE, etc on the source database to make the object metadata definitions match. It is extremely error-prone as it is difficult for developers to know and predict object metadata definitions, in light of varying patch levels and potential customizations applied at the target database. It is very inefficient, time and resource intensive as it is not a generic solution, and requires repeated analysis and the same DDL commands to be used in multiple SQL scripts for different hard-coded objects. For example, a developer may prepare a SQL script file called "create_test_table.sql" which contains specific, hard-coded DDL (Data Definition Language) commands like DROP TABLE TEST_TABLE, CREATE TABLE TEST_TABLE to create the TEST_TABLE. A listing of SQL is shown in FIG. 6B for the above-described example of table object called "TEST_TABLE" which has two columns.

The drawbacks of SQL scripts are as follows. First, there is no concept of a metadata definition file in the context of SQL Scripts. Therefore, use of SQL scripts does not allow for the archiving and versioning of object metadata definitions in a source code control system. Second, the SQL is not generic because it cannot accept as input an object whose metadata is to be patched. Instead, prior art SQL contains hard-coded references to individual object names (such as "TEST_TABLE" in the example of FIG. 6B) that are used in a specific database. Third, this method is inefficient, time and resource intensive as it requires extensive analysis to be repeated for many sql scripts that handle different database objects. Fourth, this method is very error-prone as it is often difficult to predict the object metadata at a target database on account of varying patch levels and customizations present at the target database.

U.S. Pat. No. 6,785,673 granted to Fernandez et al. on Aug. 31, 2004 and entitled "Method For Converting Relational Data Into XML" is hereby incorporated by reference herein in its entirety. This patent describes converting relational data into an XML document, to construct materialized XML views of relational databases.

See also U.S. Pat. No. 6,732,095 granted to Warshavsky et al. on May 4, 2004 and entitled "Method And Apparatus For Mapping Between XML And Relational Representations" that is also incorporated by reference herein in its entirety. This patent describes a method to convert data between a relational format and an XML document, by creating a set of XML Mapping Definition from metadata; selecting relational data from a relational application database, and converting the relational data to the XML document using the set of XML Mapping Definition.

SUMMARY

Computers in accordance with the invention are programmed to automatically generate complete metadata that is descriptive of an object in a first database, compare the generated metadata to a corresponding object in a second database (either directly or indirectly through hashcodes), and change the second database object as may be necessary to conform to the generated metadata if certain differences are found during comparison. The just-described change in the second database is also referred to herein as "patching".

In several embodiments, the first database and the second database are relational databases, and the object being compared has at least one table which in turn has columns of predetermined data types. In many applications of the just-described embodiments, differences in tables between the two databases arise from changes being made to one or more software programs (also called "applications") that use such databases, for example in upgrading the software program(s) to fix defects and/or provide additional functions, and such changes are propagated. If differences in the tables being compared are due to customizations of the second database that are permitted, then the second database is left unchanged. Therefore, automatic database patching in accordance with the invention, as described in the previous paragraph, supports application upgrade.

BRIEF DESCRIPTION OF THE FIGURES

FIGS. 4A-4G illustrate portions of a file that is generated by the generation utility of FIG. 2 and used by the comparison utility of FIG. 3 in certain embodiments of the invention.

FIGS. 6A and 6B illustrate files used in two prior art methods for patching a database, namely output of a utility called "ODF" and SQL scripts respectively.

DETAILED DESCRIPTION

Figure 1:
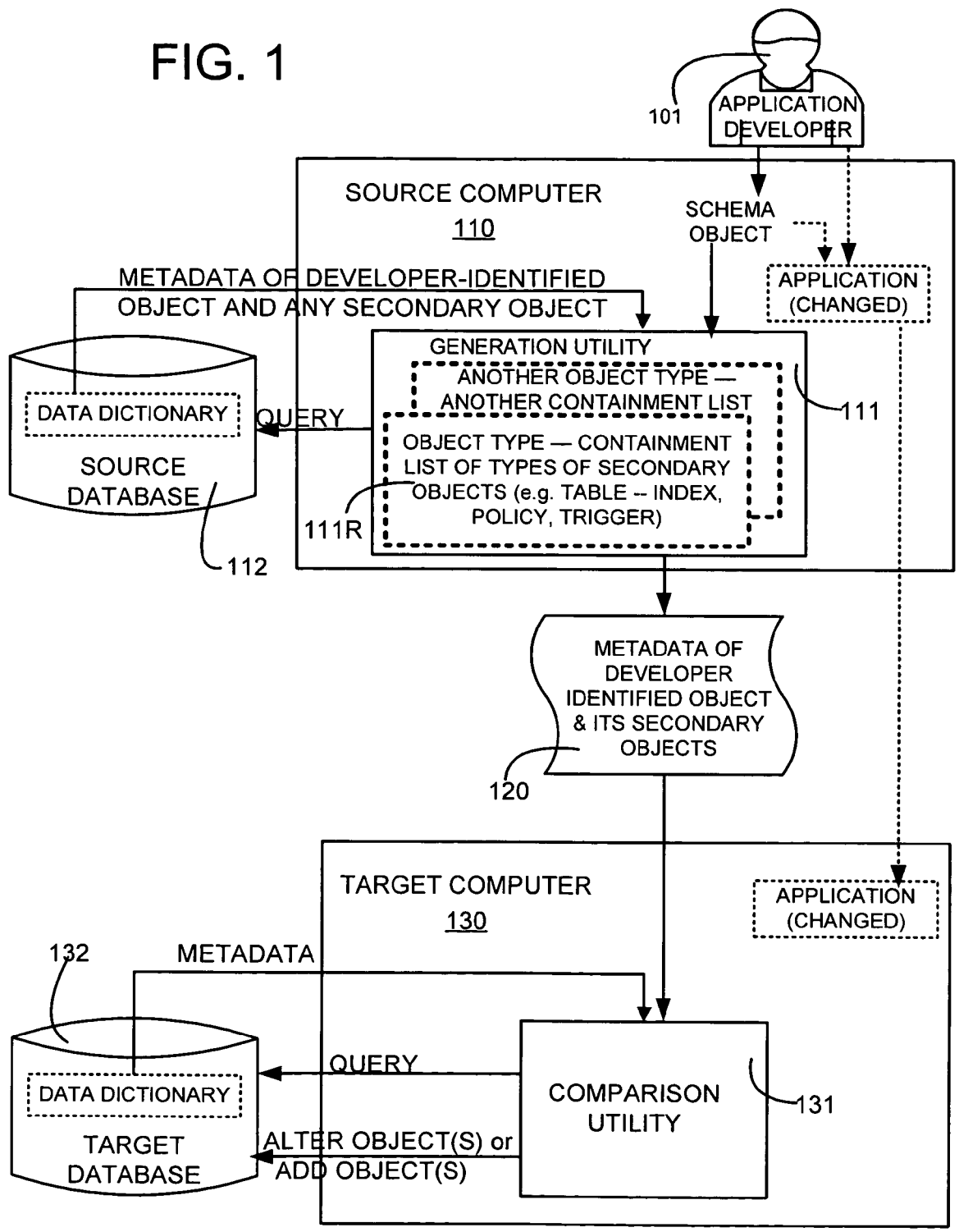
FIG. 1 illustrates, in a block diagram, a source computer programmed with a generation utility and a target computer programmed with a comparison utility in accordance with the invention.

Databases are automatically patched in some embodiments of the invention by use of two utilities 111 and 131 that are respectively executed in a source computer 110 and a target computer 130, as illustrated in FIG. 1. Source computer 110 is coupled to a storage medium (such as a hard drive) containing a source database 112 used by an application being maintained by a human (hereinafter "developer") 101. Developer 101 identifies to source computer 110 one or more objects (which are structures for storage of data, such as tables and views) used by the application, so that the target database 132 can be patched when the application is changed in target computer 130. In many of the embodiments described herein, databases 112 and 132 are both relational databases, that are accessed through an identical database management system (DBMS). Note, however, that the invention may also be implemented in embodiments wherein the databases are not relational and/or wherein the databases (that are being kept in conformance) are accessed through different DBMS.

Source computer 110, when executing utility 111 (also called "generation utility") automatically extracts, from source database 112, metadata that completely describes an object identified by developer 101, for example by querying a data dictionary contained in source database 112. The data dictionary holds information about the structure of database 112, such as (1) names of objects (e.g. tables, views, snapshots, indexes, clusters, synonyms, sequences, procedures, functions, packages, triggers, and so on), (2) information about integrity constraints, (3) default values for columns, (4) how much space has been allocated for and is currently used by the objects in the database, (5) auditing information, such as who has accessed or updated various objects.

In many embodiments of the type described herein, a "schema" is a collection of logical structures of data, or schema objects. A schema in some such embodiments is owned by a database user and has the same name as that user, and each user owns a single schema. Schema objects in some embodiments can be created and manipulated with SQL and include the following types of objects: Clusters, Database links, Database triggers, Dimensions, External procedure libraries, Indexes and index types, Java classes, Java resources, and Java sources, Materialized views and materialized view logs, Object tables, object types, and object views, Operators, Sequences, Stored functions, procedures, and packages, Synonyms, Tables and index-organized tables, and Views.

In several of the embodiments described in the previous paragraph, other types of objects are also stored in the database and can be created and manipulated with SQL but are not contained in a schema: Contexts, Directories, Profiles, Roles, Tablespaces, and Users. In such embodiments, schema objects are logical data storage structures. Schema objects of such embodiments do not have a one-to-one correspondence to physical files on disk that store their information. However, in these embodiments, the relational database stores a schema object logically within a tablespace of the database. The data of each object in such embodiments is physically contained in one or more of the tablespace's datafiles. For some objects, such as tables, indexes, and clusters, the embodiments may allow a developer to specify how much disk space the relational database allocates for the object within the tablespace's datafiles. Also, in many embodiments, there is no relationship between schemas and tablespaces: a tablespace can contain objects from different schemas, and the objects for a schema can be contained in different tablespaces.

Note that the metadata being extracted by utility 111 of some embodiments is all of the information that the data dictionary in source database 112 maintains for a given object. Therefore utility 111 captures any change to the object that may have been made in source database 112 by anyone for any reason. Source computer 110 uses the extracted metadata to automatically prepare (when programmed by utility 111) a text file 120 that describes the developer-identified schema object, including its property values. For example, if the schema object identified by the developer is a table, then text file 120 contains at least (a) name, (b) owner, (c) data type of each column in the table, and (d) default data value of each column in the table.

As noted at the beginning of the previous paragraph, many embodiments of generation utility 111 capture the values of all properties that schema objects of certain types may have. For example, schema objects that are tables have one or more of the following properties: partitioned/non-partitioned, type of partition, number of partitions, number of subpartitions, global temporary v/s permanent, index organized table (IOT), clustered or not, and tablespace. All such property values that are held in a data dictionary of a database for the developer-identified object are automatically captured in some embodiments of utility 111, for example by use of a Metadata API of the Oracle database management system. Therefore, utility 111 of these embodiments eliminates the use of an enumerated set of properties that each object type has. Hence, utility 111 does not need to be changed in any manner, even when one or more new properties are created for an object type during a future enhancement.

Furthermore, in some embodiments, generation utility 111 also captures metadata of one or more objects (called "secondary objects") that are in some manner related to (e.g. depend on) developer-identified schema objects of certain types. For example, developer-identified objects that are tables could have, associated therewith, one or more of the following types of objects: indexes, policies, triggers and constraints. Such object types are identified in some embodiments in a predetermined set (called "containment list") that is uniquely associated with (and hence identified by) each type of schema object that a developer may identify (also called "primary object"). As noted in the previous paragraph, for each secondary object (that is associated with a developer-identified object), all its property values are captured by utility 111, based on the data dictionary, and hence file 120 provides a complete description of a developer-identified object. Specifically, containment lists 111R (FIG. 1) are used with a data dictionary in source database 112 to see if any information identified by the just-described list is available in source database 112 for objects of the type (called primary objects) identified by the developer. Each object type, such as a table or a materialized view, has its own containment list 111R as shown in FIG. 1.

Note that an object type is primary if its identification by the developer is accepted by utility 111 for generation of a corresponding text file 120, and otherwise the object type is secondary. Note also that secondary object types are normally present in one or more containment lists and hence they are not identified explicitly by the developer. Note further that each primary object type has an associated containment list (which may be empty in some cases). Depending on the embodiment, an object type that is primary in one embodiment may be secondary in another embodiment and vice versa. Utility 111 contains an identification of the types of objects that are primary, and checks the developer's input to confirm that a primary object is being identified before generation of the corresponding text file 120.

Note that although the word "list" is used in referring to a data structure that holds an identification of all secondary object types that may be associated with a primary object type, any other data structure (such as an array) may be used depending on the embodiment. One or more containment lists are used by generation utility 111 of some embodiments to extract from the data dictionary in source database 112 the metadata on all secondary objects (their properties) associated with a developer-identified object. The extracted metadata (in whole or in part, depending on the embodiment) of a given developer-identified object is written to the corresponding text file 120. Note that text file 120 is just one of a number of text files that are generated by utility 111, e.g. one text file for each developer-identified object.

Use of containment lists as discussed herein eliminates the need for a developer to explicitly identify to utility 111 all objects whose metadata is to be captured, because utility 111 automatically identifies all the secondary objects of a developer-specified primary object. Therefore, utility 111 eliminates errors that arise from a developer overlooking one or more objects that may be present in a data dictionary and whose metadata needs to be captured to reflect a change in the database. Moreover, utility 111 obtains metadata from the data dictionary which is the source of truth, thereby (1) eliminating errors that arise from the use of intermediate data (e.g. if the intermediate data is not up to date) and (2) eliminating the need for a CASE data-model repository and a snapshot utility. Such use of containment lists also results in storage of all metadata of all related objects in an single data structure (such as a file), which can improve performance during comparison with a target database, as discussed below.

File 120 is referred to herein as a "text" file when it contains character sequences, e.g. in any predetermined format such as ASCII or EBCDIC. File 120 of all embodiments is a text file that can be edited by use of a simple text editor, and requires no special or proprietary editing tools. In contrast, binary files are not text-based and thus are neither editable nor accessible to text-oriented tools. Note that in some embodiments, file 120 is expressed in an XML file format, which defines an industry standard syntax for data exchange, because XML allows for easy data transformation and manipulation unlike proprietary data file formats.

Specifically, file 120 of several embodiments is expressed in a predetermined language that contains tags, e.g. in extensible markup language XML or any language in conformance with SGML. XML and SGML are well known industry standards, as described at, for example, the website obtained by replacing dashes with dots in the following www-w3-org. Use of an industry standard syntax in file 120 enables the expression of hierarchical relationships within the metadata in file 120. For example, an industry standard syntax (e.g. as per XML) allows identification of any number of properties and the values associated with such identified properties for any object in the database.

Regardless of which format (whether binary or text) and which language (XML or SGML) is used, file 120 that has been prepared by source computer 110 is supplied to target computer 130. File 120 may be supplied to computer 130 in any conventional manner (e.g. by transmission over a network, or by storage to an optical storage medium that is physically moved between computers 110 and 130).

Next, target computer 130 retrieves, from target database 132, metadata that describes a version of the objects in file 120, and compares the retrieved metadata to file 120. Target computer 130 changes the schema object version in target database 132 to conform to file 120, depending at least partially on an outcome of comparing.

Note that the mere fact that a schema object differs between databases 112 and 132 does not automatically result in changing of target database 132 in most embodiments, because the difference may arise from customizations that are allowed to be made to target database 132. For example, a table in target database 132 may have been customized by addition of a new column, and/or by addition of a new index and if these are the only differences then the comparison utility leaves database 132 unchanged in the target computer (although it's structure is different from database 112).

Note that the above-described acts can be performed repeatedly, for each of a number of schema objects that are identified by developer 101. Developer 101 may identify all schema objects that are used in an application being changed, or alternatively identify only those schema objects that developer 101 knows are being changed.

Note further that in many embodiments of the type described above, application developer 101 also changes an application in computer 110 that uses source database 112, and the changed application is supplied to computer 130. Computer 130 executes the changed application, on target database 132, after the target database is changed as described above. In this manner, the above-described database patching supports application upgrades.

In some embodiments, databases 112 and 132 are Oracle databases that are accessible through RDBMS Release 9.2, and an application programming interface (API) called Metadata API is used by each of computers 110 and 130 to extract metadata from the respective databases 112 and 132.

Note that computer 130's comparison of metadata retrieved from target database 131 to file 120 may be performed either directly (e.g. metadata is itself compared) or indirectly (e.g. a hash code is prepared using the metadata, and it is the hash codes that are compared). Specifically, in many embodiments of the invention, source computer 110 prepares and stores in file 120 one or more hash code(s) to be used by target computer 130 in comparing with corresponding hash code(s) prepared from the schema object's version in target database 132. Use of hash codes during comparison results in performance optimization which was not achieved in any prior art system known to Applicants.

If the two hash codes from the two databases match, then no change is made on target database 132. If the two hash codes do not match, then the two metadata versions of each property and/or each secondary object are compared (which comparison can also be done either directly or indirectly). Specifically, in some embodiments, source computer 1 10 prepares and stores in file 120 a hash code for each and every secondary object whose metadata is being stored in file 120. Therefore, target computer 130 compares these hash codes with corresponding hash codes prepared from corresponding secondary objects of the schema object's version in target database 132.

The following description is of an illustrative embodiment of the invention for Oracle E-Business Suite Application upgrade and/or patching process. In this embodiment, an XML-based database object definition (XDF) file is prepared and used in the context of an Oracle Database. The above-described two utilities are implemented as command line executables with the generation utility named as FNDXDFGEN and the comparison utility named as FNDXDFCMP. Note that in this embodiment, certain attributes are "secondary" objects, whereas schema objects that result in an XDF file are "primary" objects. Note that in this embodiment, there is one XDF file for each primary object. The following object types are supported in this embodiment.

TABLE A

| | Object Type | Details | Primary/ Dependent |
|---|---|---|---|
| 1 | Tables | These include normal tables, partitioned tables, IOTs (index-organized tables), tables with collection datatypes like VARRAYS and nested table type, spatial datatypes | Primary |
| 2 | Indexes | These include B*tree, Bitmap, Hash, Domain indexes, partitioned indexes. | Dependent, as they are based on specific columns in specific tables. |
| 3 | Views | | Primary |
| 4 | Sequences | | Optional - could be treated as per user choice as either Primary/secondary object |
| 5 | Triggers | | Optional - could be treated as per user choice as either Primary/secondary object |
| 6 | Constraints | These include - Primary Key, Foreign Key, Not null, Unique and Check Constraints | Dependent, as they are based on tables. |
| 7 | User Data-Types (UDTs) | | Primary |
| 8 | Application Context | | Primary |
| 9 | Queue Tables | | Primary |
| 10 | Queus | | Primary |
| 11 | Policies | | Dependent |
| 12 | Materialized Views on Materialized Views or Base Tables | | Primary |
| 13 | Materialized view logs on base tables | | Primary |
| 14 | Materialized View logs on Materialized Views | | Dependent |

In this embodiment, the generation utility 200 (see FIG. 2) aids in creating XDF files containing database object definitions in XML file format. The generation utility 200 uses the Metadata API available in Oracle RDBMS v9i to capture the database object definition in XML and augments the XML to enable its use in patching. The generation utility captures object definitions for all specified objects in XDF files. The generation utility 200 extracts schema object definitions into xml format in files that end with the extension ".xdf". The xdf extension is to distinguish XML files containing object definitions from other XML files containing data.

The format of each xdf file is such that a primary object along with all its secondary object(s) are clubbed together in one file. For example—the definition of a table along with all its indexes, constraints and triggers are clubbed together in one single xdf file.

The generation utility 200 is written in PERL (xdfgen) and Java (FndXdfGen). The PERL xdfgen utility is a simplified wrapper over the standalone java utility—FndXdfGen. The generation utility 200 augments the base definition generated by the Metadata API and has the following features. The generation utility 200 also: Automatically generates XDF filenames based on the name of primary object; Generates hash codes based on object definitions to enable optimum comparison at the target databases. The generated hashcode gets compared with the hashcode generated for the object in the target database. DBMS_UTILITY.GET_VALUE( ). The generation utility 200 uses a standard, more granular XDF structure where definition of a primary object gets clubbed along with relevant secondary objects. This allows for a more optimized comparison and enables the developer to easily make change/maintain the object definitions.

The generation utility 200 also provides support for features like deferred Indexes, Drop/Creation of Constraints, CustomDefault. The former two features apply only in the context of Xdf Comparison utility (FndXdfCmp) invoked during application patching. The deferred indexes feature is applicable when extensive data-loading into tables is anticipated in a patch, subsequent to index creation. The deferred indexes feature defers the creations of the 'flagged indexes' to a subsequent phase after the data-loading to optimize the index rebuild. The Drop/Create Constraint feature is also useful in the data-loading context (similar to deferred indexes) or while making data-model changes that involves changes to relationships between tables.

Note that the CustomDefault feature can be used even while running comparison utility 300 in standalone mode. This is a very useful feature when a constraint on a column is being changed from NULL to NOT NULL, or while adding a new column with NOT NULL constraint. In such cases, this parameter which can either contain a value or SQL clause can be used. Also, hint generation (which results in a description) for all objects in the XDF files makes it easier for any calling program, e.g. a patching utility (called "ADPATCH") to invoke comparision utility 300.

Generation utility 200 also: captures database comments on tables, view, materialized view and their columns; generates tags for Oracle Applications specific metadata such as: Tablespace Classification, Logical Primary Keys & PK Columns, Logical Foreign Keys & FK Columns, Histogram Information, and Translation related information (e.g. whether the data is translatable into a another language, such as German).

Comparison utility 300 (see FIG. 3) aids in propagating the definitions of schema objects from a source database to target databases by using compare-merge techniques and can be invoked by any patching utility to process XDF files. In this manner, XDF utilities of FIGS. 2 and 3 facilitate efficient propagation of database component changes with application changes.

Figure 2:
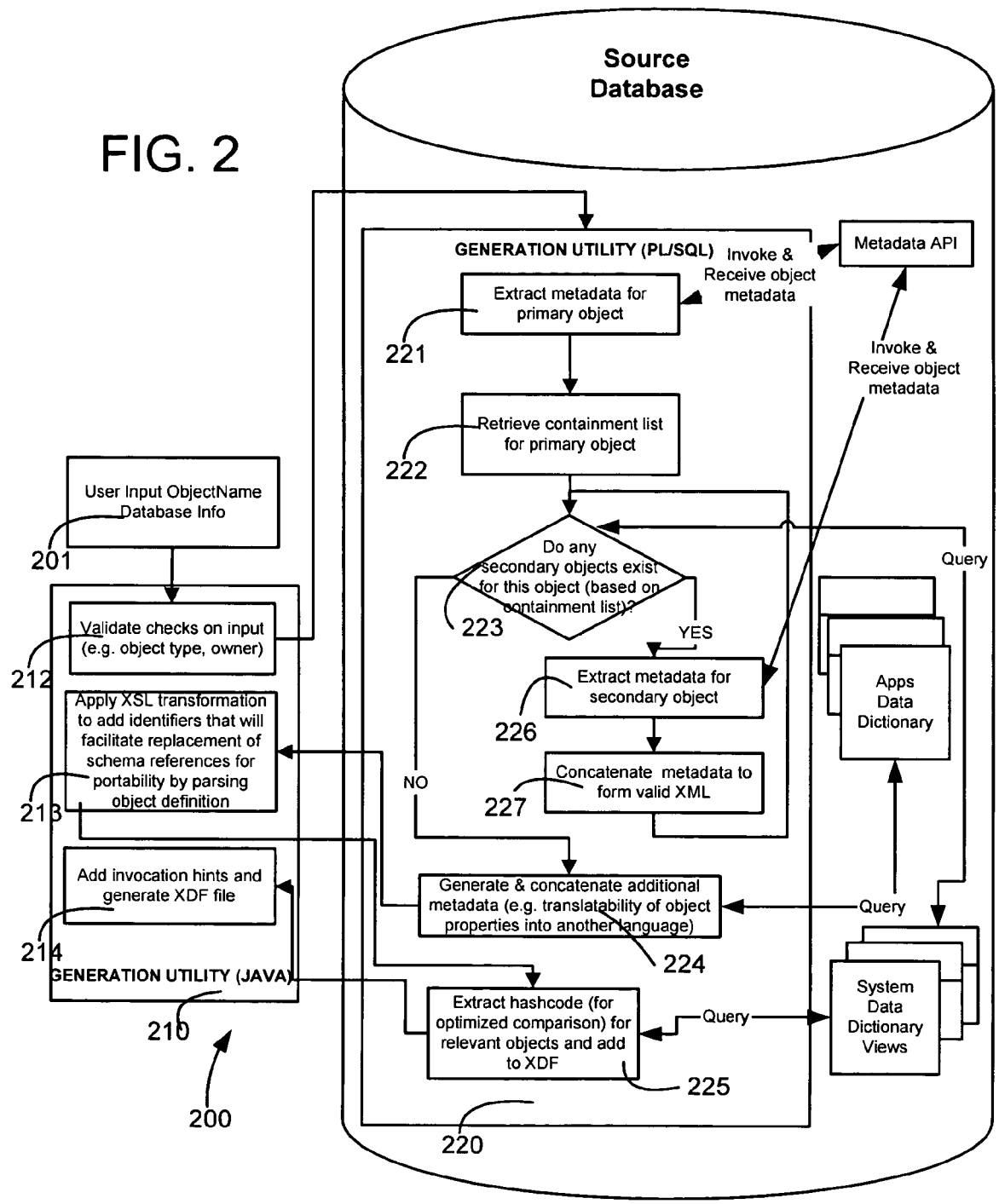
FIG. 2 illustrates, in a flow chart, acts performed in some embodiments of a generation utility of the type illustrated in FIG. 1.
Figure 3:
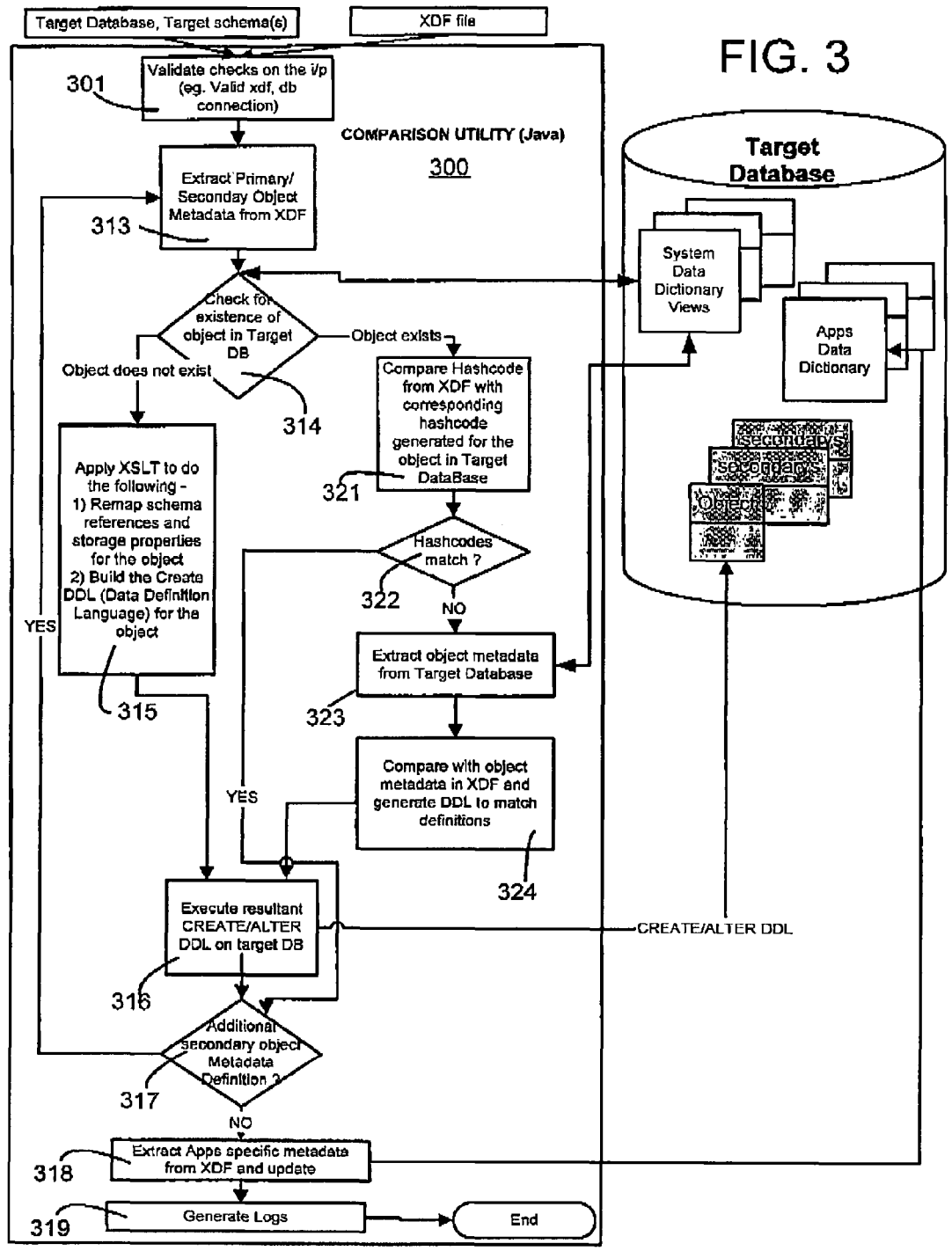
FIG. 3 illustrates, in a flow chart, acts performed in some embodiments of a comparison utility of the type illustrated in FIG. 1.
Figure 4D:
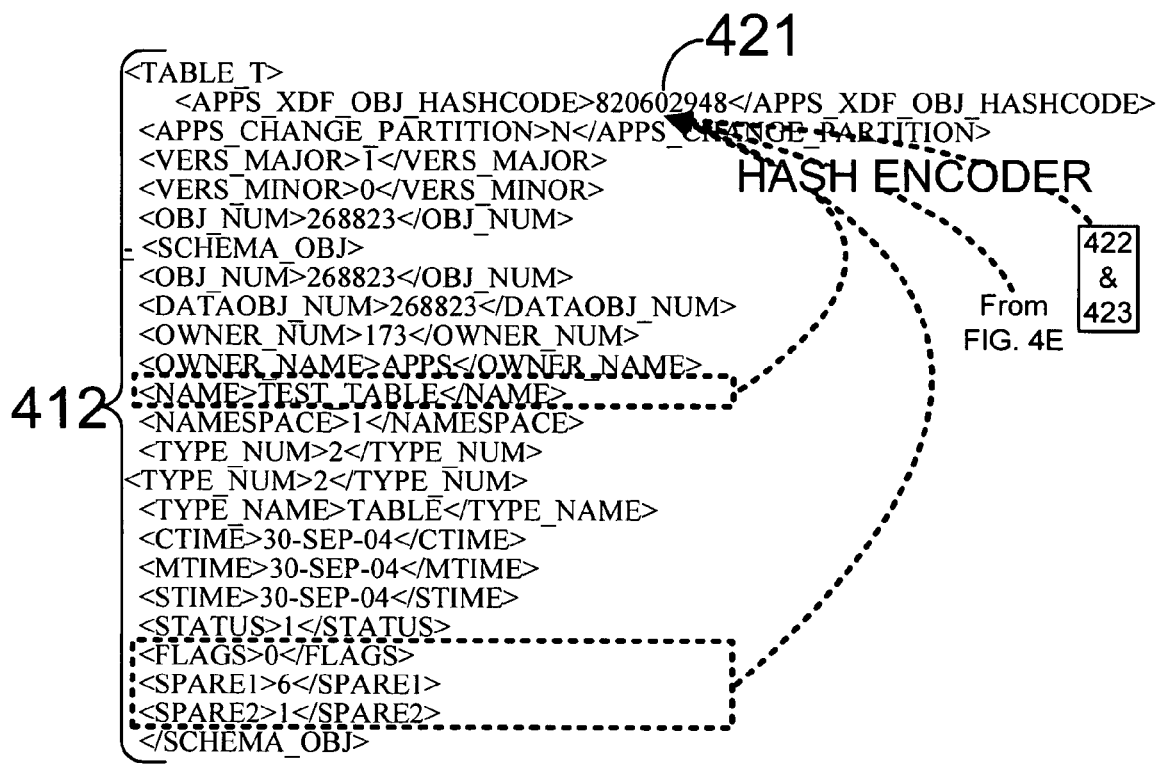

In general, the XDF utilities of FIGS. 2 and 3 help to streamline the Oracle E-Business Suite Application patching process in the context of database component changes. They also make all Oracle E-Business Suite Applications patches more efficient, performance optimized and easy to debug/diagnose with respect to database component changes. By converging all database component changes into XML format, they enable customers to proactively review and analyze changes that are to be made to their database on application of a patch in a single and consistent manner. Note that this happens when a debug feature of the comparison utility is used in some embodiments.

The utilities 200 and 300 of FIGS. 2 and 3 are generic and applicable for use in patches/patching process of any product outside of Oracle that uses Oracle database components. For example, any other Enterprise Applications product or Suite of Applications based on the Oracle Database can use the generation and comparison utilities illustrated in FIGS. 2 and 3 in their patches/patching process.

Generation utility 200 of FIG. 2 includes two components, a program 210 written in Java that performs acts 212-214, and another program 220 written in a language for stored programs (e.g. PL/SQL) that performs acts 221-225. Specifically, input from a human (also called "user" or "developer") is provided in act 201 to identify the database and to identify one or more primary objects whose metadata is to be written into the XDF file. Program 210 validates the received information in act 212, e.g. to confirm that the user who provided the information is the owner, etc. Program 210 also checks in act 212 that the identified object is a primary object (as per Table "A" above).

If the user's input is found to be valid in act 212, then program 220 is invoked. Program 220 performs act 221 to extract the metadata for a primary object identified in the user's input, as per act 221. As noted above, the Metadata API of Oracle RDBMS is used in some embodiments to obtain the metadata of the primary object from the source database. Note that the functions of the Metadata API access the system data dictionary. Next, in act 222, program 220 retrieves a containment list of secondary object types that the primary object is likely to have. The just-described list of secondary object types is defined in this particular embodiment in the form of containment rules, as shown in Table "B".

TABLE B

| | Primary Object Types | Details | Secondary objects | Containment in XDF |
|---|---|---|---|---|
| 1 | Tables | These include Global Temporary tables, IOTs (index organized tables), Queue Tables, normal tables, Tables with types (eg. VARRAYS and nested tables types, object types, spatial data- | Indexes, triggers (optional), constraints, sequences, policies | One Table & all its secondary object definitions in an XDF file. |

TABLE B-continued

| Primary Object Types | Details | Secondary objects | Containment in XDF |
|---|---|---|---|
| | types) Partitioned tables | | |
| 2 Materialized Views on Materialized Views | | Indexes, triggers (optional), Materialized view logs. | One MV & its secondary object definitions in an XDF |
| 3 Materialized Views on Base Tables | | Indexes, triggers (optional) | One MV & its secondary object definitions in an XDF |
| 4 Materialized View Logs on base Tables | | Indexes, triggers (optional), constraints | One MV Log & its secondary object definitions in an XDF |
| 5 Views | | | One View definition per XDF |
| 6 Application Context | | | One Context definition per XDF |
| 7 Queue Tables | | | One Queue Table definition per XDF |
| 8 Queue | | | One Queue definition per XDF |
| 9 User Data Types | | | One User Data Type per XDF |
| 10 Sequences | Optional - could be treated as per user choice as either Primary/secondary object | | One or more sequences per XDF |
| 11 Triggers | Optional - could be treated as per user choice as either Primary/secondary object | | One or more triggers per XDF |

In the above table, "MV" is an abbreviation of "materialized view", which is further described elsewhere herein.

Referring to FIG. 2, after act 222, act 223 is performed to check whether or not, based on the containment rules for the current object, there are any secondary objects existing in the source database. If the outcome is no, then act 224 is performed by program 220 to generate metadata, followed by act 213 in program 210. In act 213, XSL transformation is applied to replace schema references by parsing the object definition. Specifically, schema references for an object (including owner of the object and any other schema references that could be part of the object definition) in the source database are likely to differ at the target database. For example, a customer's requirement could be that same object be created under another schema owner in the target database. For this reason, additional identifiers are added to the XDF file (in a process called "remapping"), to facilitate schema replacement at the target database, to support portability.

Next, as per act 225, a hash code is prepared for each object in the metadata (regardless of the object's type being primary or dependent). While a hash code may be prepared in any conventional manner, in some embodiments the hash code is obtained by invoking an API in the Oracle database called DBMS_UTILITY.GETHASHVALUE( ). The hash code being prepared is for use in comparing the corresponding definitions of object types (like Tables, Indexes, Queues, Queue Tables, Sequences) in a target database. In case of objects like Tables, there is a base hashcode generated for the table itself. There are additional hashcodes generated for certain properties (e.g. column in a table). This is because, in case of differences in the object being compared, there are additional properties that are compared to quickly identify the change (e.g. column level properties like Column name, Data-types, Data-type length, Constraints, Default Values may be individually compared if a specific column's hash codes are found to be different during comparison).

In an illustrative example, the following table's metadata is extracted from the data dictionary:

| SQL> DESC TEST_TABLE | | |
|---|---|---|
| Name | Null? | Type |
| COL1 | | NUMBER(15) |
| COL2 | | DATE |

To obtain an individual hashcode, for each column in a table, utility 200 constructs a concatenated string of that column's properties such as name, Data-types, Data-type length, Constraints, Default Values, etc. Hence in the above example, to get the base hashcode for COL1—pass a concatenated string—'COL1NUMBER15' to DBMS_UTILITY.GET_HASH_VALUE, which returns the hashcode for COL1. Similarly get hashcodes for COL2-COL4. To get the base hashcode for TEST_TABLE—pass a concatenated string containing Table name, table properties like 'Cache'/'No-Cache'/'Logging'/'Nologging'/etc and individual hashcodes for each column to DBMS_UTILITY.GET_HASH_VALUE, which returns hashcode for TEST_TABLE.

After hash codes are obtained, they are written to the xdf file, followed by performance of act 214 in FIG. 2. Specifically, in act 214, invocation hints are added to the xdf file, followed by writing of the file to a medium to be used to transfer the xdf file(s) to the target computer. Act 214 is the last act in program 210 which therefore concludes, thereby to complete the execution of generation utility 200.

Note that in act 223, if a secondary object is found to exist in the source database (i.e. the outcome is yes), then act 226 is performed to extract metadata of the secondary object, followed by act 227 in which the secondary objects metadata is physically appended to metadata previously extracted, to form valid XML. Thereafter, act 223 is again performed, until there are no secondary objects of any of the types defined by object containment rules in Table "B" listed above.

Note that act 223 of some embodiments may incorporate multiple checks, e.g. an initial check as to whether an object of the type currently being processed has a containment rule, and if so whether any object types are identified by the containment rule for this type of object, and if so whether any actual objects are defined in this database that are of the object type identified in the containment rule. All such checks are performed automatically, to enable generation utility 200 to extract the metadata of any object that a developer may identify, as well as any dependent objects that the developer-identified object may have.

Comparison utility 300 (FIG. 3) parses the file 120 prepared by the generation utility 200, for object definitions that reside in it and compares each object definition with that of a corresponding object present in the target database. If a corresponding object is not present, utility 300 attempts to create the object by extracting a create DDL from the file 120, and otherwise, it applies delta differences (Alter DDLs) to make the object definitions in the file 120 match to the target database 132.

Comparison utility 300 of some embodiments also handles differences in database DDL syntax with respect to new features available in specific versions. Comparison utility 300 of several embodiments also has a debug mode which when invoked reports all the changes that are intended to be made based on a specific file 120 and a specific target database 132, without actually making the changes.

Comparison utility 300 of one embodiment has the following advantages: 1) unlike prior (non-generic) SQL script-based solutions, no manual analysis is required for each database component change, including revision history of the database object; 2) less error-prone and therefore improves patch success rates; 3) enables easy diagnosis and analysis in case of failures; 4) provides support for all Oracle database components; 5) easier to maintain, evolve and avoid costs in terms of resources and time; 6) optimized to improve time taken during patching; 7) eliminates myriad different files involved previously & replaces them with XML file format, which is the Industry standard A comparison utility 300 of this embodiment is written in PERL and Java, and it compares database object definitions contained in the file 120 with the actual database object definitions in the target database and then applies the changes to the object in the target database accordingly. This comparison utility 300 also contains the following features: Supports Customization to object storage that is frequent occurrence at most customer databases; supports both Dictionary and locally managed Tablespaces available in Oracle Databases; supports propagating database comments for tables/views/materialized views at the target database; and supports automatic drop/recreate of Indexes and materialized view logs on materialized views. When a XDF materialized view query differs from the query in the target database the MV needs to be dropped and re-created. Once a materialized view is dropped the dependent indexes and materialized view logs are automatically dropped. XDF handles the re-creation of these secondary objects automatically.

Comparison utility 300 of this embodiment also supports object creation in parallel, grants privileges and creates synonyms for base schema objects to the appropriate APPS (application) schema(s) at the time it creates the base schema objects. It verifies the synonyms in the same way that it verifies the base schema objects themselves. This comparison utility 300 also updates AOL (Application Object Library) Data Dictionary for schema object definition related changes. These tables are automatically updated by XDF with the relevant data. Finally, this comparison utility 300 also support for new and old tablespace models & integration with the AD (Applications Database) Tablespace API.

AOL (Application Object Library) Data Dictionary tables updated by the XDF Comparison utility are as shown in Table "C" below.

TABLE C

| | |
|---|---|
| FND_TABLES | FND_COLUMNS |
| FND_FOREIGN_KEYS | FND_PRIMARY_KEYS |
| FND_FOREIGN_KEY_COLUMNS | FND_PRIMARY_KEY_COLUMNS |
| FND_VIEWS | FND_HISTOGRAM_COLS |
| FND_OBJECT_TABLESPACES | |

Referring to FIG. 3, on receipt of input from a human, act 301 is performed to validate the input. Specifically, a database connection is established in act 301 and an xdf file identified by the human is checked to confirm that its syntax is valid. Note that in many embodiments of the type described herein, the xdf file being checked is the same xdf file which is prepared by the generation utility discussed above. Note, however, that the xdf file may be an altered version of the generated xdf file, depending on the embodiment. For example, because the xdf file is expressed in XML format, a simple text editor can be used by a human to modify the generated xdf file and the modified file can be supplied to the comparison utility 300. Note further that since the xdf file is in XML format a source code control system (such as SCCS available for the Unix operating system) is used in some embodiments to version control the xdf file. Such version control of the xdf file is used in several such embodiments with version control of application source code, so that changes being made to a database (e.g. addition of a new column to an existing table) are in conformity with changes being made to application source code that refers to the database (e.g. references to the new column).

After act 301, the comparison utility 300 performs an act 313 wherein metadata is extracted from the xdf file. The metadata is being extracted for all the objects in the file. Next, in act 314 the target database is checked for existence of the object whose metadata is extracted in act 313. If the object doesn't exist, then act 315 is performed. In act 315, XSLT is applied to 1) replace schema references and storage properties for the object and 2) build the Create DDL (data definition language) for the object. XSLT is the XSL Transform language being used to apply remap of schema and storage for the object, as these could differ at the target database.

Act 315 of the comparison utility 300 builds the Create DDL. Therefore, after act 315 is completed, act 316 is performed to execute a CREATE/ALTER DDL command on the target database. Next, in act 317, a check is made to see if metadata for any additional secondary object is still present in the xdf file, and if so then control returns to act 313. In act 317 if no additional metadata is present, then act 318 is performed, wherein APPS (Applications) specific metadata present in the AOL (Application Object Library) Data Dictionary is extracted from the xdf file and updated in the AOL (Application Object Library) Data Dictionary at the target database. Next, logs are generated in act 319 which record the results of all the Xdf comparison acts including any errors, warnings and finally reports either success/failure of the metadata propagation to the target database. Applications System Administrators and Database Administrators will monitor the logs to gauge the success/failure of the patch.

In act 314, if the object is found to exist in the target database, then act 321 is performed wherein hash codes are compared. If the hash codes match in act 322, then act 317 is performed as discussed above. If there is no match in the hash codes, then act 323 is performed wherein the object metadata is extracted from the target database. Next, act 324 is performed wherein the object metadata in the xdf file is compared with the metadata from the target database. All differences between metadata are resolved in favor of the xdf file metadata. Next, act 316 is performed, as discussed above.

FIGS. 4A-4G illustrate the output of one embodiment of the above-described generation utility 200 in the form of a single file test_table.xdf which uses the above-described TEST_TABLE example. In view of the descriptive annotations provided to test_table.xdf, the tags shown in FIGS. 4A-4G are self-explanatory to a skilled artisan, as these tags and the metadata representation in the XDF directly correspond to the system data dictionary in an Oracle Database. Note that all of the text in FIGS. 4A-4G is located one after another in a single file of extension "xdf", although shown separated in the individual figures for convenience. The very beginning of this file contains the text in FIG. 4A which includes a hint 401 to assist a user of a target computer in invocation of the comparison utility.

Following hint 401 is a list 402 of all objects whose metadata is present in this file. Following list 402 is a set of tags 411 (FIGS. 4B and 4C) that contain application specific metadata. Following the application specific metadata tags 411 is the set of tags 412 (FIGS. 4D-4F) that contain metadata of the TEST_TABLE object. Note that a hash code 421 (FIG. 4D) is included in this file for the entire TEST_TABLE object. This hash code 421 is generated from not only property values of the table, such as name, flags in FIG. 4D and blocks, groups in FIG. 4E, but also additional hash codes as noted next. Specifically, in file 120, a hash code is also included for certain properties such as each column, as illustrated by hash codes 422 and 423 (FIG. 4F) for the two columns in this example. Note that these hash codes 422 and 423, are used in preparation of hash code 421 for the table. All hash codes 421-425 are sent over from the source computer to the target computer, at their appropriate locations in file 120 to enable quick comparison.

Note that after the metadata of the TEST_TABLE object, in this example file 120 contains additional metadata as shown in FIG. 4G which is automatically extracted by generation utility 200 as per act 226 in FIG. 2, for a secondary object that is automatically identified in this example as being a constraint from a containment list for "table" type primary objects (because object TEST_TABLE is a table type primary object). Note that the metadata in FIG. 4G for the index is placed in file 120 immediately after the metadata of TEST_TABLE.

Utilities 200 and 300 are used to program a computer system 500 of the type illustrated in FIG. 5 which is discussed next. Specifically, computer system 500 includes a bus 502 (FIG. 5) or other communication mechanism for communicating information, and a processor 505 coupled with bus 502 for processing information. Computer system 500 also includes a main memory 506, such as a random access memory (RAM) or other dynamic storage device, coupled to bus 502 for storing information and instructions to be executed by processor 505.

Main memory 506 also may be used for storing temporary variables or other intermediate information during execution of instructions to be executed by processor 505. Computer system 500 further includes a read only memory (ROM) 504 or other static storage device coupled to bus 502 for storing static information and instructions for processor 505. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 505. Another type of user input device is cursor control 515, such as a mouse, a trackball, or cursor direction keys for communicating direction information and command selections to processor 505 and for controlling cursor movement on display 512. This input device typically has two degrees of freedom in two axes, a first axis (e.g., x) and a second axis (e.g., y), that allows the device to specify positions in a plane.

As described elsewhere herein, automated database patching is provided by computer system 500 in response to processor 505 executing one or more sequences of one or more instructions contained in main memory 506. Such instructions may be read into main memory 506 from another computer-readable medium, such as storage device 510. Execution of the sequences of instructions contained in main memory 506 causes processor 505 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 505 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 505 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 505 retrieves and executes the instructions. The instructions received by main memory 506 may optionally be stored on storage device 510 either before or after execution by processor 505.

Computer system 500 also includes a communication interface 518 coupled to bus 502. Communication interface 515 provides a two-way data communication coupling to a network link 520 that is connected to a local network 522. Local network 522 may interconnect multiple computers (as described above). For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 525 or to data equipment operated by an Internet Service Provider (ISP) 526. ISP 526 in turn provides data communication services through the world wide packet data communication network 524 now commonly referred to as the "Internet". Local network 522 and network 524 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 550 might transmit a requested code for an application that has been changed and file 120 (describing objects in a changed database that are used by the application) through Internet 528, ISP 526, local network 522 and communication interface 518. In accordance with the invention, one such downloaded application and file 120 provides for implementing automated patching of a database, as described herein.

The received application and file 120 may be executed by processor 505 as it is received, and/or stored in storage device 510, or other non-volatile storage for later execution. In this manner, computer system 500 may obtain the file 120 and the related application in the form of a carrier wave.

Figure 5A:
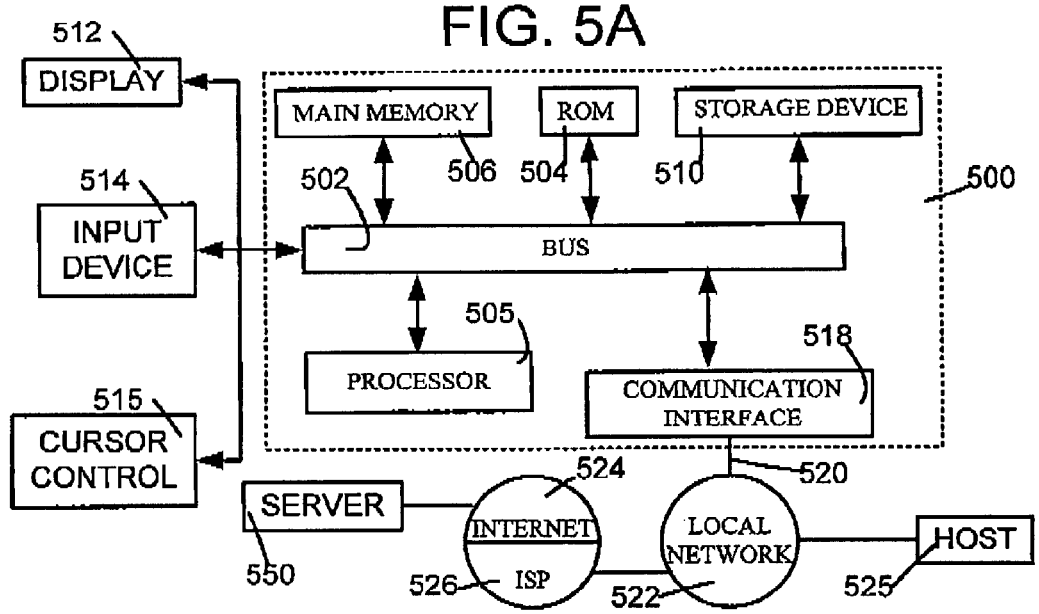
FIG. 5A illustrates, in a block diagram, portions of a source computer and of a target computer of the type illustrated in FIG. 1.
Figure 5B:
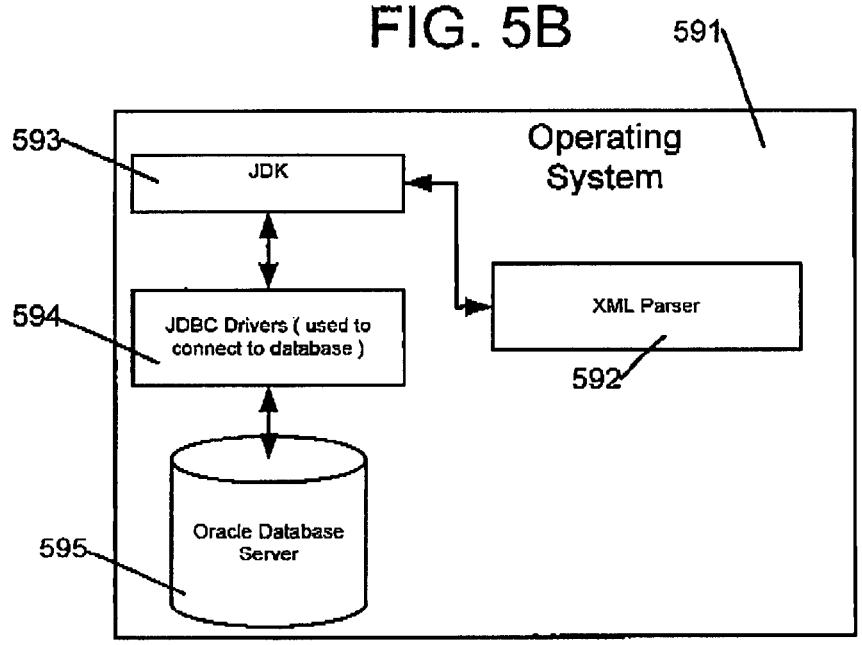
FIG. 5B illustrates, in a block diagram, software in memory 506 of FIG. 5A.

Note that FIG. 5A is a very low-level representation of many hardware components of a computer system. Several embodiments have one or more additional software components in main memory 506 as shown in FIG. 5B: Operating System 591 (e.g. Microsoft WINDOWS 2000), Database Server 595 (e.g. Oracle Server v9i2 for the source computer; e.g. Oracle Server v8i for the target computer), Java Development Kit 593 (e.g. JDK v118), Java XMLParser 592 (e.g. xmlparser available from Oracle Corporation), and JDBC drivers 594 (e.g. JDBC driver available from Oracle Corporation).

Numerous modifications and adaptations of the embodiments described herein will become apparent to the skilled artisan in view of this disclosure. For example, although two computers 110 and 130 are shown in FIG. 1, all acts described above as being performed by these computers are performed by a single computer in an alternative embodiment. In the alternative embodiment, the source database and the target database are both present in the single computer. In still other embodiments, generation of file 120 and comparison with target database 122 are performed in one computer while changing of the database is performed in another computer. Moreover, file 120 as well as changes to an application that are supported by database changes documented in file 120 may be packaged into a set of files that are distributed together (on a single storage medium or on the same carrier wave) to customers interested in upgrading their version of the application. In addition, the comparison utility may itself be packaged into the just-described distribution in some embodiments. Also, the above-described generation and comparison utilities can be used i) by internal development teams during creation and testing of object definitions and ii) for propagating these object definitions to customer databases during patching.

Numerous modifications and adaptations of the embodiments described herein are encompassed by the scope of the invention.

The following appendices A-E are a integral part of this detailed description and are incorporated by reference herein in their entirety. These appendices provide further detailed descriptions of an illustrative embodiment of the type shown in FIGS. 2 and 3.

Appendix A

Assumptions

The following assumptions have been made in the context of XDF Generation/Comparison Utility Design.

The format of the xdf (xml file containing object definitions) file is such that the parent object and its secondary object(s) are clubbed together in one file. For Example—the table definition along with all its indexes, constraints and triggers are clubbed together in one single XML file. XDF utility creates the grants and synonyms for base schema objects to the appropriate APPS (applications) schema(s) at the time the base schema objects are created. This happens in the comparison utilty. This utility verifies the synonyms in the same way that it verifies the base schema objects themselves, and only recreates the synonym if they are missing or incorrect. XDF utility creates a grant for a base object giving the corresponding APPS (applications) schema 'grant all with grant option' on that base object.

Tables

In addition to normal tables, XDF supports the following types of tables:
  Global Temporary Tables.
  Queue Tables.
  Partitioned Tables.
  Index Organized Tables (IOTs).

1. XDF utility supports both the database native default clause and also the custom default value. Product team that require the default clause in effect after the patch is applied will use the native default clause and product teams which require the default clause only during the time the patch is applied, typically for a column modification from NULL to NOT NULL will use the custom default clause.
2. Support for range and hash partitions during table creation will be supported.
3. No partition maintenance operations are supported.
4. XDF utility does not support partitioning of an existing non-partitioned table. This requires that the following steps be performed which are time consuming and may require manual intervention
   Record grants and constraints on the table
   Disable constraints
   Rename table
   Create table as partitioned
   Transfer data from non-partitioned table to partitioned table, either by Exchanging partitions or DML
   Enable constraints and recreate grants
   Hence XDF utility does not support partitioning of an existing non-partitioned table.
5. XDF utility provides support for creating tables with collection datatype like Varrays and nested Table as the datatype of a relational table. Here it is assumed that the corresponding Type reference already exists.
6. Global temporary tables cannot be altered or dropped if in use by another session. DDL statements on these tables must be done in a phase where no DML is using these tables.

Constraints

1. XDF utility supports constraints—Primary Key, Foreign key, Not null, Unique and Check Constraints. By default these constraints are created along with the object creation unless the drop and recreate flag for the constraints has been defined. In that case the constraints are not created when the underlying table is created/modified. If the constraints are found to already exist, then they are dropped. The constraints are then created/recreated later in a different phase. The drop recreate flag concept is similar to the defer flag passed to FNDXDFGEN utility. This flag should be used only in cases like when patches change data structures and require a data upgrade and a constraint change and the data cannot be changed with the old constraint in place, and the old constraint cannot be replaced with the new one until the data has changed.
2. If a constraint has evolved then the existing constraint is dropped and recreated with the definition in the XDF file. If the constraint is Primary or Unique Key then the CASCADE option is used which drops any existing referential constraints. The onus is on the development team to make sure that any dependent foreign keys are released in the same patch as the evolved Primary or Unique Key.
3. The constraints are an integral part of the table XDF definition. There is no separate section in the XDF file dealing with constraints. Also any modification to the constraints is done along with the underlying table changes after the indexes on the tables have been created. This prevents the indexes from being created in the wrong tablespace.

Views

The query underlying the view should not contain any schema references. The view query should be using the synonym created for the base tables and should not refer the base tables directly.

Materialized Views

Materialized views are schema objects that can be used to summarize, precompute, replicate, and distribute data. They are suitable in various computing environments such as data warehousing, decision support, and distributed or mobile computing. Materialized views are used to precompute and store aggregated data, such as sums and averages. They can also be used to precompute joins with or without aggregations. Cost-based optimization can make use of materialized views to improve query performance by automatically recognizing when a materialized view can and should be used to satisfy a request. The optimizer transparently rewrites the request to use the materialized view. Queries are then directed to the materialized view and not to the underlying detail tables or views. Materialized views are similar to indexes in several ways: they consume storage space, they must be refreshed when the data in their master tables changes, and, when used for query rewrites, they improve the performance of SQL execution and their existence is transparent to SQL applications and users.

Oracle maintains the data in materialized views by refreshing them after changes are made to their master tables. The refresh method can be incremental (fast refresh) or complete. For materialized views that use the fast refresh method, a materialized view log or direct loader log keeps a record of changes to the master tables.

Materialized views can be refreshed either on demand or at regular time intervals. Alternatively, materialized views in the same database as their master tables can be refreshed whenever a transaction commits its changes to the master tables.

A materialized view, when created, will create a table, an index and may be one or more views, all in the same schema as that of the materialized view. If you create a materialized view MV, a table (MV), an index (I_SNAP$_MV) will be created in the same schema.

XDF supports the following Materialized View features—
  Partitioned Materialized Views
  Hierarchical Materialized Views (i.e. Materialized Views on Materialized Views)
  Other Materialized View features provided by the RDBMS.

XDF does not support the following Materialized View features at this point
  Creation of Refresh Groups
  Materialized views in a distributed environment (for eg. Over DB links)
  Subsequent alters to a Partitioned MV XDF recommends the following standards, applicable to Materialized Views creation and modification. Some of these are enforced—
  Pre-built Tables are not used in conjunction with Materialized Views and are not supported. It is stated—"Do not create MV with pre-built option. Pre-built does not impose the integrity check on the MV and it is up to the users to verify it, making it an unreliable option to use for DBI"—Enforced
  Materialized Views should be created in the APPS schema.
  A Materialized View can reference multiple tables belonging to multiple products and only the APPS schema is guaranteed to have required privileges, on these tables.

Base schema tables, referenced in Fast-refresh MV query, must be qualified with schema name, as there are some issues with referencing the synonyms directly. This is required for fast refresh to work.—Enforced The Materialized View should be initially created with deferred Refresh.

Refreshes are not handled by XDF other than the initial refresh during creation of the Materialized View.

Comments on the Materialized View and all columns in the Materialized View are required for future eTRM purposes XDF alters the Materialized view in the following cases—

Storage parameters change

Refresh method, mode, or time change

Enable or disable query rewrite.

XDF drops & re-creates the Materialized View in the following cases—

Query change Note: Dropping and recreating Materialized Views is an expensive operation, requiring the handling of secondary objects like (MV Logs, Indexes). It requires a complete refresh of the MV and other dependent MVs that reference it.

Materialized View Logs

A materialized view log is a schema object that records changes to a master table's data so that a materialized view defined on the master table can be refreshed incrementally.

Each materialized view log is associated with a single master table or a materialized view. The materialized view log resides in the same database and schema as its master table or materialized view.

XDF supports the following Materialized View Log features—

Creation of Partitioned Materialized View Logs

Materialized View Logs on Materialized Views (partitioned/non-partitioned) based.

XDF alters the Materialized view Log in the following cases—

Storage parameters change

Filter Column changes

XDF drops & re-creates the Materialized View Log in the following cases—

Rowid to Primary Key & vice versa

Filter Columns in Target DB, but not in XDF

Sequences

The 'START WITH' value of a sequence cannot be modified once the sequence has been already created because the data could be potentially already used.

Indexes

1. The physical attributes of a partition in a partitioned index are assumed to be the same as that of the underlying index. If different sets of values have been specified for different partitions then modification to these physical attributes is not supported by XDF phase 2.
2. If the functional indexes use a user-defined function then the function must exist in the database i.e. the creation of function-based index should in a phase after the creation of PL/SQL packages.
3. As per divisional standards for Function-based indexes— The packages are created in the APPS schema and in order to create a function-based index, the schema owning the table (BASE) must have EXECUTE privilege on the functions used in the index. Also, the packages are created with INVOKERS RIGHTS privileges. So the schema owning the table must have access to underlying objects.

Types

Object types are schema objects. They are abstractions of the real-world entities—for example, purchase orders—that application programs deal with. There are two categories of object datatypes:

Object types

Collection types

Object datatypes use the built-in datatypes and other user-defined datatypes as the building blocks for datatypes that model the structure and behavior of data in applications.

Each collection type describes a data unit made up of an indefinite number of elements, all of the same datatype. The collection types are array types and table types. The corresponding data units are called VARRAYs and nested tables.

XDF alters the ADT in the following cases:

Storage parameters change

Filter Column

XDF drops & re-creates the ADT in the following cases:

Rowid to Primary Key & vice versa

Filter Columns in Target DB, but not in XDF

Appendix B

Design Details

Table and Constraints on Table

XSL (kutable.xsl) is used to transform the XDF file containing the description of the table into a create DDL statement, if the object does not exist in the target database. If the object exists then a hashcode is generated for the object from the target database and is compared with the hashcode present in the XDF. If they do not match the individual columns are compared based on the column names. The column sequence of the column is not considered. Any difference in the column structure is modified with 'ALTER TABLE' clause.

To add an additional column to the table the following syntax is used

ALTER TABLE <table name> ADD (<column definition>)

If the column to be added is a NOT NULL column then a database default value has to be provided. Otherwise an error is returned indicating that a NOT NULL column without any default value is being added to the existing table.

To modify a column from NOT NULL to NULL

ALTER TABLE <table name> MODIFY (<column name> NULL)

To modify a column from NULL to NOT NULL

ALTER TABLE <table name> MODIFY (<column name> NOT NULL)

If the column contains NULL values then the above DDL statement fails and the corresponding error is returned.

To modify other properties of a column

ALTER TABLE <table name> MODIFY (<new column definition>)

The datatype of any column can be changed only if all the rows for the column are null. The size of a column can be increased. But to decrease the size of column all the rows for the column must contain NULL. If the column to be modified is part of the table or index partitioning key or part of a domain index the definition of the column cannot be modified. Corresponding errors are returned for any of the above exceptions.

To modify the storage parameters

ALTER TABLE <table name> STORAGE (<storage clause> <value>)

ALTER TABLE <table name> INITRANS <value> MAXTRANS <value> etc . . .

The storage parameters are modified only if the modified value is greater than the current existing default value. Error related to auto segment space management is ignored. Also the degree of parallelism is always set to NOPARALLEL if otherwise. The PCTINCREASE is also always set to 0 if otherwise and similarly MAXEXTENTS to UNLIMITED.

To modify the integrity and referential constraints

If the constraint already exists and has evolved then the constraint is first dropped using ALTER TABLE <tableName> DROP CONSTRAINT <constraintName>

The keyword CASCADE is appended to the above ALTER statement if the constraint is a primary or unique key.

The constraint definition is then constructed from the xdf file and created using the following statement ALTER TABLE <tableName> ADD CONSTRAINT <constraintName> [UNIQUE|PRIMARY KEY] (column list separated by a ',')

If the constraint is a foreign key constraint then the following DDL is used

ALTER TABLE <tableName> ADD CONSTRAINT <constraintName> FOREIGN KEY (column list separated by a ',') REFERENCES <tableName> (column list separated by a ',')

The referenced table name cannot exist in multiple schemas. The table schema should be uniquely identifiable.

If the constraint is a check constraint then the following DDL is used.

ALTER TABLE <tableName> ADD CONSTRAINT <constraintName> CHECK (check condition)

Views

If the view contained in the XDF file does not exist in the target database then a XSL file (kuview.xsl ) is used to transform the XDF file into a create DDL statement. If the object exists then the underlying view query in the xdf file is compared with the query in the database and if different the view is re-created by transforming the XDF file into a create or replace DDL statement.

ODF creates all views with FORCE option. The default behavior for existing views is "replace" (replace existing view using 'CREATE OR REPLACE FORCE VIEW').

Sequences

The 'kuseq.xsl' XSL file is used to transform the XDF file containing the description of the sequence into a create DDL statement, if the sequence does not exist in the target database. If the object exists in the target database the existing sequence is compared with the sequence description in the XDF file and any difference is modified with the ALTER SEQUENCE clause.

An Error is returned if the existing START WITH value of the sequence is greater than MAXVALUE of the sequence in the XDF file.

The DDL statements that can be issued to equate the sequence in the target database are ALTER SEQUENCE <sequenceName> INCREMENT BY <new Value> [MAXVALUE <integer>/NOMAXVALUE] <MINVALUE <integer>/NOMINVALUE] [CYCLE/NOCYCLE] [CACHE <integer>/NOCACHE] [ORDER/NOORDER]

Indexes

The 'kuindex.xsl' XSL file is used to transform the XML file containing the description of the index, into a create DDL statement, if the object does not exist in the target database. If the DDL statement execution fails because of "maximum number of extents exceeded" error, then the initial extent is set to the value of how much space the index used when it hit maxextents and the process is looped to maximum of ten times for the CREATE statement to succeed.

If the create statement fails because of "column list already indexed" error then an attempt is made to rename the already existing index to the one specified in the XML file. But if the uniqueness of both the indexes is different then the existing index is dropped and recreated according to the definition in the XML file along with a warning message.

An error message is displayed for any other unacceptable error in the creation of the index.

To rename the index the following DDL statement is used:

ALTER INDEX <existing index name> RENAME to <indexName>

To alter storage parameters the following statements are used:

ALTER INDEX <indexName> STORAGE (<storage clause> <value>)

ALTER INDEX <indexName> INITRANS <value> MAXTRANS <value> etc . . .

To split or add to an existing partitioned index the following statement is used ALTER INDEX <indexName> SPLIT PARTITION <partition_name> INTO (PARTITION <partition_name1> PARTITION <partition_name2>)

To rename an existing partition

ALTER INDEX <indexName> RENAME PARTITION <partition name> TO <partition name1>

If the index already exists in the database, then the index in the XML file and the index in the database are compared. If the difference is because of any of the following cases then the index is dropped and recreated:

The table name or table owner is incorrect

The uniqueness is wrong

The database index has too few columns

The database index has too many columns

The database index has right number, wrong column names

The database index has right number, right names, and wrong order

The database index is a non-partitioned index and the file index is a partitioned index and vice versa The database index is a global index partition and the file index is a local index partitions and vice versa.

The database index partition is a range partition and the file index is a hash partition The database index is bitmap index and file index is a non-bitmap index The following statement is used to drop the index: DROP INDEX <index name>

Once the index is dropped then the XSL transformation is applied to the XML file to generate the CREATE INDEX statement.

Appendix C

Generator Utility Usage Notes

The XDF generator program is the next generation version of the current odf utilities to generate database object definitions in XML. The specific file extension used for these xml files is .xdf (to distinguish xml files containing object definitions from others). The generator program currently requires Oracle 9iR2 database, since it uses the metadata API (dbms_metadata).

Note: The xdf file contains the complete definition of the primary object and secondary object(s). After initial generation of the xdf file, subsequent changes, regardless of whether they are specific only to the primary object and/or secondary object(s) result in the complete definition of the primary and secondary object(s) being generated.

Usage:
    java oracle.apps.fnd.odf2.FndXdfGen
        jdbc_conn_string=<jdbc tns info> object_name=<object name>
        xsl_directory=<xsl file Dir>
        [object type=<object type>]
        [owner_app_shortname=<application short name of schema in which object is to be created in>]
        [apps_schema=<appId>]
        [apps_pwd=<appPassword>]
        [jdbc_protocol=<jdbc driver type>]
        [xdf_filename=<xdf file name>]
        [deferred=<all|<list>>]
        [Dropcr=<list>]
        [logfile=<filename>]
        [Custom_Defval=colName1=col1Value;colname2=col2Value]
        [IncludeTriggers=<n|<list>>]
        [IncludePolicy=<n|<list>>]
        [PolObjName=<object_name>]
        [PolObjOwner=<object_owner>]
        [Data_Sec_Vpd=<y|Y>]
        [Base_Partition=<partition_name>]
        [IncludeSequence=<list>]
        [Apply_DbVersion=<Database_Version>]
        [Comments_Only=<Y/N>]
        [obsolete=<all|none>]

Mandatory Arguments
    jdbc_conn_string: jdbc tns information either in format of Net8 connect string enclosed in double quotes or hostname:port:oracle_sid format.
    object_name: The name of the database object whose XML object definition is being extracted. If the mode is trigger or sequence then the wildcard character '%' can be used in the object name to retrieve a set of related sequences or triggers.
    xsl_directory: The xsl directory, which contains all the xsl files required for XSLT transformation. This is parameterized to facilitate any additional custom transformations that may be required for hosting or other purposes.

Optional Parameters
    apps_schema: ORACLE schema name of current APPS (Applications) schema. Default=APPS, if not specified.
    apps_pwd: ORACLE schema password of current APPS (Applications) schema. Default=APPS, if not specified.
    jdbc_protocol: jdbc protocol (thin or oci8). This parameter is required to procure a connection from the JDBC Driver manager. Default=thin, if not specified.
    object_type: The Primary object type for which the xml definition is required—table, qtable, mview, mviewlog, sequence, type, trigger, view owner_app_shortname: This parameter refers to the Application short name of the application to which the object belongs. The owner_app_shortname is currently used as an informational parameter only. The Application information is used to populate the AOL (Applications object Library) Data Dictionary. Since the Database allows the same object name to be used in different schemas, this is required. This will be used to determine the schema in which to create the object, given that schema names can be different at customer sites. If object already exists, it defaults to the value in AOL(Applications object Library) data Dictionary. Otherwise, the base application (application with lowest application id will be picked).
    xdf_filename: The default behavior is that the xdf file name will be autogenerated based on the Primary Object Name. The object definition of the specified object is retrieved in the file mentioned. The file name will be automatically prefixed with ".xdf" extension. Default=<object_name>.xdf
    Deferred: This is support for the deferred creation of indexes until later. To specify which indexes to defer, use the option: deferred=<comma-separated list of indexes to defer> or if all indexes have to be deferred then deferred=all. This option is relevant in context of Applications Database Patching Utility. It is relevant for the standalone utility usage only when used in conjunction with constraints.
    DropCr: ODF supports dropping constraints and recreating them in a later phase. The list of constraints that have to be dropped and recreated are specified as dropCr=<comma separated list of constraints>.
    Logfile: The output of odfv2 generator program is written to standard out. Specify a logfile name if it has to be written to a log file.
    Custom_defval: This pertains only when the mode is equal to table. If a table column needs to be updated with a specific value when the table definition is modified (usually from null to not null, or adding a new not null column), then the custom_defval parameter can be used. The format of this parameter value is columnName=<value>. If more than one column in the table has to be updated, then the delimiter is semicolon ';'.
    IncludeTriggers: This is to specify a list of triggers to be included with the table definition. By default all triggers on a table are included in the XDF file along with the table definition. If trigger definitions are not to be included along with table definitions, this parameter needs to be used with 'N'. Else, a comma-separated list of trigger names should be provided. The default value is IncludeTriggers=y
    Base_Partition: This is to specify the name of the partition to be included with the table definition. By default all the partitions on a table, is included in the XDF file along with the table definition. By specifying this parameter it is ensured that only the specific partition is included in the XDF file.
    IncludeSequence: This is to specify a list of sequences to be included with the table definition. By default the sequence, which drives the (logical) primary key on a table, is included in the XDF file along with the table definition. It is assumed to be of the format <table_name>_S. If additional sequence definitions are to be included along with table definition, this parameter needs to be used with a comma-separated list of sequence names.
    Apply_DbVersion: This is to specify the minimum version of the target database to apply the objects in the XDF file. By default all the objects in the XDF file are created/compared on the target database. By specifying this option you apply the objects in the XDF file if and only if the target database version is greater than or equal to the specified apply_dbversion.
    Comments_only: [Y/N], This option is used if, only the comments specified on the object in the XDF file have to be propagated. By default the value for this option is N i.e. all the objects specified in the XDF file are propagated.
    Obsolete: Currently, support to obsolete MVs & base table MV logs is provided. In case of MVs, the base MV will be dropped, obsoleting all its secondary objects like indexes, MV log, triggers, etc, In case of base table MV logs, the MV log is dropped, obsoleting secondary objects like indexes, triggers, etc. Partial obsoletion of secondary objects is an enhancement we are considering for the future. Permitted values are obsolete=all. The default value is obsolete=none.

EXAMPLES

1. Global Temporary Table—The following command is used to generate a XDF file with file name wf_local_users_temp.xdf for a table WF_LOCAL_USERS_TEMP, which belongs to a product with application short name FND.
   java oracle.apps.fnd.odf2.FndXdfGen
   jdbc_conn_string=ap105fam:1521:atg9idev
      object_name=WF_LOCAL_USERS_TEMP xsl_directory=/nfs/group/fnddev/fnd/11.5/patch/115/xdf/xsl
2. Table—The following command is used to generate a XDF file with file name jtfftasksb.xdf in the directory /home/bhthiaga/odfjtatest/xml/ for a table JTF_TASKS_B which belongs to JTF(application short name). In this example, the optional parameter custom_defval is used (if you are changing a column definition from null to not null or adding a not null column and need to give a custom default value to update that column with the custom default value).
   java oracle.apps.fnd.odf2.FndXdfGen
   jdbc_conn_string=ap105fam:1521:atg9idev
   object_name=JTF_TASKS_B xsl_directory=/nfs/group/fnddev/fnd/11.5/patch/115/xdf/xsl
   custom_defval="OBJECT_VERSION_NUMBER=1;"
3. Table—The following command is used to generate a XDF file with file name percon for table PER_CONTRACTS_F that belongs to PER(application short name of the product). In this example, the optional parameters deferred (for indexes) and dropcr (constraints) are used. This means that the indexes are deferred and constraints are dropped and recreated in a later phase. Usually this is required when there is a change in constraint/index definition and data upgrade is required to achieve that change.
   java oracle.apps.fnd.odf2.FndXdfGen
   jdbc_conn_string=ap105fam:1521:atg9idev
      object_name=PER_CONTRACTS_F xsl_directory=/nfs/group/fnddev/fnd/11.5/patch/115/xdf/xsl
   deferred=PER_CONTRACTS_F_PK
   dropCr=PER_CONTRACTS_F_PK
4. Materialized View—The following command is used to generate a XDF file with file name bilbymv.xdf for a materialized view BIL_BI_OPTY_T_MV.
   java oracle.apps.fnd.odf2.FndXdfGen jdbc_conn_string="(DESCRIPTION=(ADDRESS=(PROTOCOL=tcp)(HOST=ap513dbs)(PORT=1521))(CONNECT_DATA=(SID=OLAPDEV)))"
   object_name=BIL_BI_OPTY_T_MV xsl_directory=/nfs/group/fnddev/fnd/11.5/patch/115/xdf/xsl
5. View—The following command is used to generate a XDF for a view ABMBG_ACT_ACCT_DATA_VAR_V. The auto-generated xdf filename will be abmbg_act_acct_data_var_v.xdf.
   java oracle.apps.fnd.odf2.FndXdfGen
   jdbc_conn_string=ap105fam:1521:atg9idev
      object_name=ABMBG_ACT_ACCT_DATA_VAR_V
      xsl_directory=/nfs/group/fnddev/fnd/11.5/patch/115/xdf/xsl
6. Materialized View Log—The following command is used to generate a XDF file with file name ak_regions_mlog.xdf for a materialized view log on the table AK_REGIONS.
   java oracle.apps.fnd.odf2.FndXdfGen
   jdbc_conn_string=ap105fam:1521:atg9idev
   object_name=AK_REGIONS object_type=mviewlog
      xsl_directory=/nfs/group/fnddev/fnd/11.5/patch/115/xdf/xsl Appendix D Comparison Utility Usage Notes The Comparison Utility compares database object definitions contained in a file with extension ".xdf" (which is an XML file) with the database objects in an ORACLE schema, detects any differences in database structure, and executes SQL statements to propagate the differences, so that the objects in the schema will match the definitions in the xdf file.

XDF (xml) files are generated by the XDF generator utility. The .xdf file extension is used to distinguish xml files containing object definitions from others.

Usage:
   java oracle.apps.fnd.odf2.FndXdfCmp
   <schemaId>
   <schemaPassword>
   <appId>
   <appPassword>
   <jdbc driver type>
   <jdbc tns info>
   <object_type>
   <xdf file name>
   <xsl file directory>
   [deferred=<list>]
   [dropCr=<list>]
   [logfile=<filename>]
   [Data_Sec_Vpd=<y|Y>]
   [Standalone=<y|Y>]
   [changedb=<y|n>]

Mandatory Arguments schema_name: ORACLE schema name in which the object exists or should be created.

schema_Pwd: ORACLE schema password in which the object exists or should be created.

apps_schema: ORACLE schema name of current APPS (Applications) schema.

apps_pwd: ORACLE schema password of current APPS (Applications) schema.

jdbc_protocol: jdbc protocol (thin or oci8).

jdbc_connect_string: jdbc tns information either in format of Net8 connect string enclosed in double quotes or hostname:port:oracle_sid format.

object_type: the object type information—table, qtable, mview, mviewlog, sequence, type, trigger, view, policy xdf_filename: The xdf file name, which contains the object definition.

xsl_directory: The xsl directory, which contains all the xsl files required for XSLT transformation.

Optional Parameters

Deferred: XDF supports deferring creation of some indexes until later. The list of indexes that have to be deferred are specified as deferred=<comma-separated list of indexes to defer>

Logfile: The output of XDF comparison utility is written to standard out. Specify a logfile name if it has to be written to a log file.

ChangeDb: The default for changeDB=y. If the changedb is specified as 'n' then the SQL statements generated by the odf comparison utility are not executed but displayed on the standard output or a log file.

DropCr: XDF supports dropping constraints and recreating them in a later phase. The list of constraints that have to be dropped and recreated are specified as dropCr=<comma separated list of constraints>.

Data_Sec_Vpd: This is used to specify that a service security synonyms or view has to be created dynamically based on the database version. If the database version is 9 then a synonym is created else a view is created. Permitted values are data_sec_vpd=y Standalone: This option is used to execute the XDF comparison utility in a standalone mode. Permitted values are standalone=y

EXAMPLES

1. Global temporary Table—The following command is used to compare a table definition in the XDF file wf_local_users_temp.xdf with the definition in the database atgcore and run sql statements to remove the differences such that the object defintion in the database matches the definition in the XDF file.

java oracle.apps.fnd.odf2.FndXdfCmp applsys apps apps apps thin ap105 fam:1521:atgcore table /home/sbrahman/ wf_local_users_temp.xdf /fnddev/fnd/11.5/patch/115/xdf/ xsl 2. Table—The following command is used to compare a table definition in the XDF file jtasyncmap.xdf with the definition in the database atgcore and run sql statements to remove the differences such that the object defintion in the database matches the definition in the XDF file. In this example, the index JTA_SYNC_CONTACT_MAPPING_U1 on the table is deferred.

java oracle.apps.fnd.odf2.FndXdfCmp jff jff apps apps thin ap 112fam:1521:atgcore table jta_sync_contact_mapping.xdf /fnddev/fnd/11.5/patch/115/xdf/xsl
    deferred=JTA_SYNC_CONTACT_MAPPING_U1

3. Materialized View—The following command is used to compare a materialized view definition in the XDF file bil_bi_opty_t_mv.xdf with the definition in the database atgcore and run sql statements to remove the differences such that the object defintion in the database matches the definition in the XDF file.

java oracle.apps.fnd.odf2.FndXdfCmp apps apps apps apps thin ap105fam:1521:atgcore mview bil_bi_opty_t_mv.xdf /fnddev/fnd/11.5/patch/115/xdf/xsl 4. View—The following command is used to compare a view definition in the XDF file aview.xdf with the definition in the database atgcore and run sql statements to remove the differences such that the object definition in the database matches the definition in the XDF file.

java oracle.apps.fnd.odf2.FndXdfCmp apps apps apps apps thin ap112fam:1511:atgcore view abmbg_act_ acct_data_var_v.xdf /fnddev/fnd/11.5/patch/115/xdf/xsl

APPENDIX E (Table Example)

| | |
|---|---|
| 1 | CREATE TABLE "TEST_TABLE" |
| 2 | ( "COL1" NUMBER(15,0), |
| 3 | "COL2" DATE |
| 4 | ) STORAGE (INITIAL 4096 NEXT 40960 MINEXTENTS 1 MAXEXTENTS 505 |

APPENDIX E-continued (Table Example)

| | |
|---|---|
| 5 | PCTINCREASE 50 FREELISTS 1 FREELIST GROUPS 1 BUFFER_POOL |
| 6 | DEFAULT) |
| 7 | |
| 8 | |
| 9 | CREATE INDEX "TEST_TABLE_I1" ON TA |

What is claimed is:

1. A method of propagating a plurality of changes made to application software that uses a first relational database, the method comprising:

a first computer receiving an identification of a first table in the first relational database;

wherein first data in the first table in the first relational database is used in the application software;

the first computer checking if the first table is a primary object, by using a first data structure comprising a first plurality of predetermined types indicative of primary objects;

the first computer extracting first metadata describing the first table from a first data dictionary;

wherein the first data dictionary is comprised in the first relational database;

the first computer using the first metadata to prepare a first description of properties of the first table, the first description being expressed in a text based markup language;

the first computer checking the first relational database, to see if said first table has associated thereto a first secondary object of any type identified by a second data structure comprising a second plurality of predetermined types indicative of secondary objects;

in response to finding said first secondary object associated with said first table during said checking the first relational database, the first computer extracting from the first data dictionary second metadata describing the first secondary object in the first relational database, and the first computer preparing a second description of properties of the first secondary object;

a second computer receiving at least: said first description of said first metadata, said second description of said second metadata, and the plurality of changes to the application software;

wherein at least one change in the plurality of changes is related to use of first data in said first table;

the second computer identifying a structural difference between said first table in said first relational database and a second table in a second relational database in said second computer, by comparing at least said first metadata of said first table to corresponding second metadata of said second table in a second data dictionary of the second relational-database;

wherein the second data in the second table is used by the second computer in executing a copy of the application software;

the second computer structurally changing the second table depending at least partially on an outcome of said comparing, to generate a changed second table; and the second computer executing a changed version of the application software, obtained by the second computer changing said copy by applying said plurality of changes, to use the changed second table.

2. The method of claim 1 wherein:
said second plurality of predetermined types comprises an index type indicative of a database index, and said first computer checks, during said checking the first relational database, if said first table has associated thereto said first secondary object of said index type.

3. The method of claim 1 wherein:
said second plurality of predetermined types comprises a trigger type indicative of a database trigger, and said first computer checks, during said checking the first relational database, if said first table has associated thereto said first secondary object of said trigger type.

4. The method of claim 1 wherein:
said second plurality of predetermined types comprises a policy type indicative of a database policy, and said first computer checks, during said checking the first relational database, if said first table has associated thereto said first secondary object of said policy type.

5. The method of claim 1 wherein:
said second plurality of predetermined types comprises a constraint type indicative of a database constraint, and said first computer checks, during said checking the first relational database, if said first table has associated thereto said first secondary object of said constraint type.

6. The method of claim 1 wherein:
said second plurality of predetermined types comprises a sequence type indicative of a database sequence, and said first computer checks, during said checking the first relational database, if said first table has associated thereto said first secondary object of said sequence type.

7. The method of claim 1 wherein:
the first description comprises at least
(a) name;
(b) data type; and
(c) default data value;
of each column in said first table.

8. The method of claim 1 further comprising:
the first computer accessing the first relational database therein using a relational database management system; and
the second computer accessing the second relational database therein using said relational database management system.

9. The method of claim 1 wherein:
the text based markup language comprises a plurality of tags.

10. The method of claim 1 wherein:
the text based markup language is extensible markup language (XML).

11. The method of claim 1 further comprising:
said first computer receiving an indication of a view in said first relational database;
said first computer preparing an additional description describing said view;
said second computer further comparing metadata of a version of said view in the second relational database to said additional description; and
the second computer altering said version of said view in the second relational database based on said additional description, depending on an outcome of said further comparing.

12. The method of claim 11 wherein:
the view is a materialized view.

13. The method of claim 1 further comprising:
the first computer preparing a first hash code using a portion of said first metadata other than an identifier of the first table;
the first computer storing the first hash code and said first description in a file; and
the second computer preparing a second hash code from said second metadata;
wherein the second computer performs said comparing by at least checking for a match between the first hash code and the second hash code.

14. The method of claim 13 wherein:
the first computer prepares a plurality of additional hash codes using said first metadata;
the first computer stores the additional hash codes in said file; and
the second computer uses the additional hash codes to find a change to be made only if the first hash code and the second hash code do not match.

15. The method of claim 1 wherein said first table comprises a plurality of columns, the method further comprising:
the first computer preparing a first individual hash code for each column in said first table using said first metadata;
the first computer further preparing a first base hash code for the first table using at least a name of said first table, a plurality of properties of said first table, and a plurality of first individual hash codes corresponding to said plurality of columns of the first table;
the first computer storing the first base hash code and the first individual hash codes in a file;
the second computer preparing a second individual hash code for each column in said second table using said second metadata;
the second computer further preparing a second base hash code for the second table using at least a corresponding name said second metadata, a corresponding plurality of properties in said second metadata, and a plurality of second individual hash codes for the columns in the second table;
wherein the second computer performs said comparing by at least checking for a match between the first base hash code and the second base hash code; and
if the first base hash code does not match the second base hash code, the second computer further checks for matches between the plurality of first individual hash codes and a corresponding plurality of second individual hash codes.

16. The method of claim 1 wherein:
the second computer keeps the second table in the second database unchanged or alternatively changes the second table, depending on whether a difference found by said comparing is only due to customization or not.

17. The method of claim 16 wherein said customization comprises addition of a new column to said second table in the second database.

18. The method of claim 1 wherein said changed application software comprises a fix of a defect in the application software.

19. The method of claim 1 wherein the second computer changes the second relational database structurally by executing a command expressed in a data definition language.

20. The method of claim 1 wherein the first table is identified by input to said first computer, as being changed.

21. The method of claim 1 wherein the first computer extracting comprises querying the first relational database by using SQL.

* * * * *

UNITED STATES PATENT AND TRADEMARK OFFICE
CERTIFICATE OF CORRECTION

| | |
|---|---|
| PATENT NO. | : 7,809,763 B2 |
| APPLICATION NO. | : 10/966250 |
| DATED | : October 5, 2010 |
| INVENTOR(S) | : Sarita Brahmandam Nori et al. |

It is certified that error appears in the above-identified patent and that said Letters Patent is hereby corrected as shown below:

In column 6, line 37, before "single" delete "an" and insert -- a --, therefor.

In column 7, line 55, delete "1 10" and insert -- 110 --, therefor.

In column 8, line 41, delete "Queus" and insert -- Queues --, therefor.

In column 9, line 42, delete "comparision" and insert -- Comparison --, therefor.

In column 10, line 62, delete "(eg." and insert -- (e.g. --, therefor.

In column 13, line 62, after "standard" insert -- . --.

In column 17, line 23, delete "515" and insert -- 518 --, therefor.

In column 18, line 62, delete "utilty." and insert -- utility. --, therefor.

In column 20, line 54, delete "eg." and insert -- e.g. --, therefor.

In column 26, line 9, delete "autogenerated" and insert -- auto generated --, therefor.

In column 26, line 55, delete "DbVersion:This" and insert -- DbVersion: This --, therefor.

In column 27, line 20, delete "jtfftasksb.xdf" and insert -- jtftasksb.xdf --, therefor.

In column 29, line 24, delete "defintion" and insert -- definition --, therefor.

In column 29, line 33, delete "defintion" and insert -- definition --, therefor.

In column 29, line 45, delete "defintion" and insert -- definition --, therefor.

In column 30, line 57, in claim 1, delete "relational-database;" and insert -- relational database; --, therefor.

Signed and Sealed this
Sixteenth Day of August, 2011

David J. Kappos
*Director of the United States Patent and Trademark Office*